United States Patent
Soga

(10) Patent No.: US 10,139,473 B2
(45) Date of Patent: Nov. 27, 2018

(54) RADAR APPARATUS INCLUDING TRANSMITTING ANTENNA AND RECEIVING ANTENNA

(71) Applicant: Panasonic Intellectual Property Management Co., Ltd., Osaka (JP)

(72) Inventor: Shigeru Soga, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 563 days.

(21) Appl. No.: 15/000,968

(22) Filed: Jan. 19, 2016

(65) Prior Publication Data

US 2016/0223644 A1 Aug. 4, 2016

(30) Foreign Application Priority Data

Feb. 2, 2015 (JP) ................................. 2015-018555

(51) Int. Cl.
*G01S 7/02* (2006.01)
*G01S 13/02* (2006.01)
(Continued)

(52) U.S. Cl.
CPC .............. *G01S 7/023* (2013.01); *G01S 7/292* (2013.01); *G01S 13/0209* (2013.01); *G01S 13/931* (2013.01)

(58) Field of Classification Search
CPC ..... G01S 7/292; G01S 13/0209; G01S 13/931
(Continued)

(56) References Cited

U.S. PATENT DOCUMENTS 5,237,586 A * 8/1993 Bottomley ........... H04B 1/7115
370/206
5,610,940 A * 3/1997 Durrant .................. H04B 1/707
375/150
(Continued)

FOREIGN PATENT DOCUMENTS

GB 2340002 A * 2/2000 ........... H04B 1/7075
JP 2001-074830 3/2001
(Continued)

*Primary Examiner* — Timothy A Brainard
*Assistant Examiner* — Nuzhat Pervin
(74) *Attorney, Agent, or Firm* — McDermott Will & Emery LLP

(57) ABSTRACT

A radar apparatus includes: a transmitting antenna; a receiving antenna; transmitting circuitry; receiving circuitry; a storage; and control circuitry which selects one of a plurality of spread codes. A radar signal includes a plurality of periodic frames. Each of the frames includes first and second segments. The first segment includes a first spread signal which is obtained by multiplication of a predetermined reference signal by at least a part of the selected spread code. The second segment includes a second spread signal which is obtained by multiplication of the identification code by at least the part of the selected spread code. The control circuitry calculates a first correlation value between a received radar signal and the first spread signal, calculates a second correlation value between the received radar signal and the second spread signal, and selects another one of the plurality of spread codes on a basis of temporal positions and magnitudes of peaks of the first and second correlation values in each frame.

11 Claims, 14 Drawing Sheets

(51) Int. Cl.
*G01S 13/93* (2006.01)
*G01S 7/292* (2006.01)

(58) Field of Classification Search
USPC .......................................................... 342/16
See application file for complete search history.

(56) References Cited

U.S. PATENT DOCUMENTS

| | | | | |
|---|---|---|---|---|
| 5,659,574 | A * | 8/1997 | Durrant | H04B 1/707 375/150 |
| 5,680,414 | A * | 10/1997 | Durrant | H04B 1/707 370/515 |
| 6,850,557 | B1 * | 2/2005 | Gronemeyer | G01S 19/235 342/357.63 |
| 7,711,038 | B1 * | 5/2010 | Underbrink | H04B 1/7093 375/130 |
| 7,852,905 | B2 * | 12/2010 | Underbrink | H04B 1/7093 375/136 |
| 7,859,450 | B2 * | 12/2010 | Shirakawa | G01S 13/325 342/147 |
| 2001/0012316 | A1 * | 8/2001 | Maruyanna | H04B 1/7113 375/148 |
| 2005/0180491 | A1 * | 8/2005 | Hiromori | G01S 7/4004 375/142 |
| 2007/0211786 | A1 * | 9/2007 | Shattil | H04B 1/707 375/141 |
| 2009/0110033 | A1 * | 4/2009 | Shattil | H04B 1/7174 375/141 |

FOREIGN PATENT DOCUMENTS

| | | | | |
|---|---|---|---|---|
| JP | 2007-187632 | | 7/2007 | |
| JP | 2008-020221 | | 1/2008 | |
| JP | 2010-175289 | | 8/2010 | |
| KR | 0158092 | B1 * | 12/1998 | ............ H04B 1/7093 |
| WO | WO-2012164898 | A1 * | 12/2012 | ............ G01S 13/288 |

* cited by examiner

RADAR APPARATUS INCLUDING TRANSMITTING ANTENNA AND RECEIVING ANTENNA

BACKGROUND

1. Technical Field

The present disclosure relates to a radar apparatus including a transmitting antenna and a receiving antenna. The present disclosure also relates to a vehicle including such a radar apparatus

2. Description of the Related Art

Vehicles, such as a car, include one which includes a radar apparatus to detect an object around the vehicle. The radar apparatus provided in the vehicle measures the distance from the radar apparatus to an object around the vehicle, the velocity of the object with respect to the radar apparatus, and the like by transmitting a radar signal and receiving the radar signal reflected by the object. Known radar systems include a frequency modulation continuous wave (FMCW) system, a pulse radar system using a spread spectrum code (hereinafter referred to as a spread code), and the like.

SUMMARY

One non-limiting and exemplary embodiment provides a radar apparatus capable of reducing interference of a radar signal.

In one general aspect, the techniques disclosed here feature a radar apparatus including a transmitting antenna, a receiving antenna, transmitting circuitry which generates a radar signal and transmits the radar signal through the transmitting antenna, receiving circuitry which receives the radar signal reflected by an object through the receiving antenna, a storage which stores an identification code unique to the radar apparatus and a plurality of spread codes, and control circuitry which selects one of the plurality of spread codes. The radar signal includes a plurality of periodic frames. Each of the frames includes first and second segments. The first segment includes a first spread signal which is obtained by multiplication of a predetermined reference signal by at least a part of the selected spread code. The second segment includes a second spread signal which is obtained by multiplication of the identification code by at least the part of the selected spread code. The control circuitry calculates a first correlation value between the received radar signal and the first spread signal, calculates a second correlation value between the received radar signal and the second spread signal, and selects another one of the plurality of spread codes on a basis of temporal positions and magnitudes of peaks of the first and second correlation values in each frame.

The present disclosure allows a reduction in interference of a radar signal. It should be noted that general or specific embodiments may be implemented as a device, an apparatus vehicle, a method or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

Figure 1:
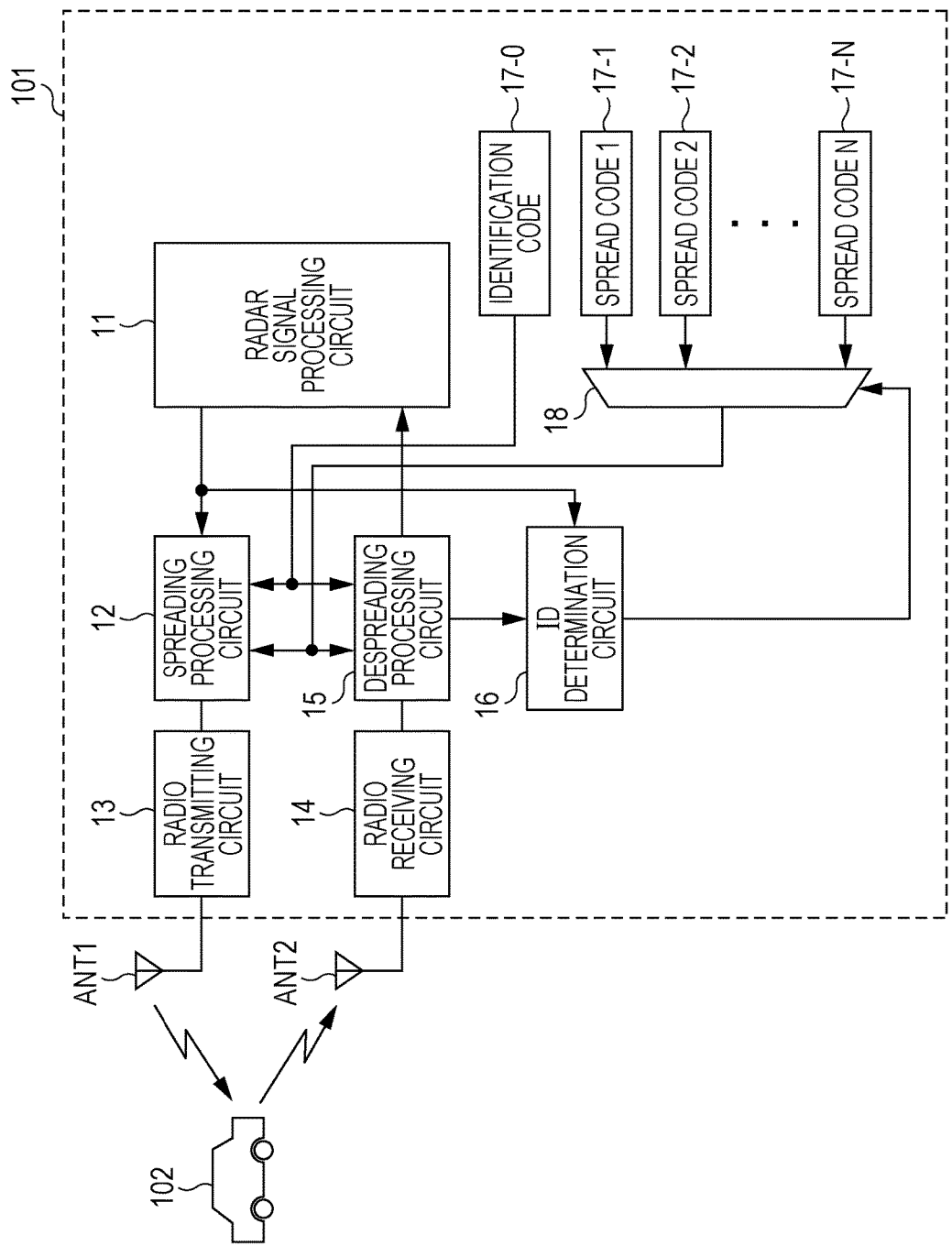
FIG. 1 is a block diagram showing the configuration of a car including a radar apparatus according to a first embodiment of the present disclosure.

DETAILED DESCRIPTION (Underlying Knowledge Forming Basis of the Present Disclosure)

If there are a plurality of vehicles provided with identical radar apparatuses (for example, radar apparatuses configured to generate radar signals which use the identical channel and the identical spread code), interference between radar signals occurs. That is, a given vehicle cannot distinguish a radar signal A (desired wave signal) which is transmitted from a radar apparatus provided in the vehicle and is reflected by an object around the vehicle from a radar signal B (interference wave signal) which is transmitted from a radar apparatus provided in another vehicle (for example, a car coming from an opposite direction). To block object-detecting capability from deteriorating, that is, to detect an object with high accuracy, it is desirable to prevent interference of a radar signal.

For example, the disclosures in Japanese Patent No. 3399884, Japanese Unexamined Patent Application Publication No. 2008-020221, Japanese Patent No. 5182645, and Japanese Unexamined Patent Application Publication No. 2007-187632 are known as radar apparatuses for detecting an object around a vehicle, such as a car, in the vehicle.

Japanese Patent No. 3399884 discloses a spread spectrum radar inter-vehicular distance measurement system using an interference elimination processor. According to the disclosure in Japanese Patent No. 3399884, each car spreads its own unique PN code with a common PN code for all cars and transmits the spread code to other cars, so that each car obtains unique PN codes of other cars (for example, a car coming from an opposite direction). Each car produces replica signals of interference waves on the basis of unique PN codes of other cars and propagation path information and cancels out the interference wave replica signals from received signals, thereby improving a distance detection error rate. According to the disclosure in Japanese Patent No. 3399884, a replica signal of an interference wave is estimated with high accuracy to dampen an interference wave, which enhances detection accuracy.

Japanese Unexamined Patent Application Publication No. 2008-020221 discloses a spread spectrum radar apparatus and a pseudo noise code generator. Since there are a limited number of types of M-series codes, and assignment of respective different codes to radar apparatuses is difficult, the likelihood of suffering interference from a radar apparatus of the same type is high. If Gold-series codes are used, although there are a larger number of types of Gold-series codes, autocorrelation and cross-correlation properties are poorer than those of M-series codes. This causes the problem of a reduction in the capability of a radar apparatus. According to the disclosure in Japanese Unexamined Patent Application Publication No. 2008-020221, pseudo noise codes are output with respective different phases for radar apparatuses. Even if a limited number of types of codes are assigned to radar apparatuses, misidentification is unlikely to occur, and a radar apparatus excellent in safety is provided.

Japanese Patent No. 5182645 discloses a radar apparatus which correctly detects an interference wave signal and appropriately avoids a decline in the capability of detecting a preceding car due to radio wave interference with another car, in the event of the radio wave interference. According to the disclosure in Japanese Patent No. 5182645, a transmitting section generates a plurality of transmission signals using different frequencies, generates a combined wave of the plurality of transmission signals, and changes the directivity of a beam on the basis of the frequency of a transmission signal as the combined wave and transmits the transmission signal. According to the disclosure in Japanese Patent No. 5182645, an interference wave signal is appropriately detected by comparing frequencies assigned to respective angle areas in the event of radio wave interference with a radar apparatus of another car. This allows appropriate avoidance of a decline in the capability of detecting a preceding car due to radio wave interference, a decline in recognition level, and the like.

Japanese Unexamined Patent Application Publication No. 2007-187632 relates to a car-mounted radar apparatus which is mounted on a movable body, transmits a transmission wave, receives a reflected wave, and detects an object. Japanese Unexamined Patent Application Publication No. 2007-187632 discloses a radar apparatus which prevents interference with a transmission wave from another radar apparatus. The disclosure in Japanese Unexamined Patent Application Publication No. 2007-187632 has a radar sensor which transmits an electromagnetic wave and receives a reflected wave of the transmitted electromagnetic wave and a control section which detects the position of an object other than a movable body from the reflected wave. The control section controls the radar sensor to transmit an electromagnetic wave in an assigned transmission period among transmission periods assigned to the radar sensor and radar sensors other than the radar sensor in a time-division manner, in accordance with a time-related radio signal received by a receiving section which receives a common time-related radio signal. With this control, interference is prevented, which allows enhancement of measurement accuracy.

However, the disclosure in Japanese Patent No. 3399884 requires complicated processing to produce a replica signal of an interference wave. Although the phase of a radar signal is changed upon occurrence of interference (misidentification) in the disclosure in Japanese Unexamined Patent Application Publication No. 2008-020221, Japanese Unexamined Patent Application Publication No. 2008-020221 does not disclose a method for detecting interference occurrence itself. While the disclosure in Japanese Patent No. 5182645 uses an interference dampening method specific to a continuous wave (CW) system or frequency modulation continuous wave (FMCW) system radar apparatus, Japanese Patent No. 5182645 does not disclose an interference dampening method applicable to a pulse radar apparatus or the like. The disclosure in Japanese Unexamined Patent Application Publication No. 2007-187632 uses time division and space division in combination, and temporal synchronization needs to be performed among a plurality of cars in advance.

Thus, there is demand for provision of a radar apparatus which is intended to detect and prevent interference of a radar signal and uses a new non-traditional principle. Under the circumstances, the present inventor has made intensive studies to provide a radar apparatus using a new principle which is applicable to a pulse radar apparatus using a spread spectrum code and is intended to detect and prevent interference of a radar signal without the need for advance synchronization and complicated processing.

Embodiments of the present disclosure will be described below in detail with reference to the drawings. Note that identical or similar components are denoted by identical reference characters and that a repetitive description thereof may be omitted.

First Embodiment

FIG. 1 is a block diagram showing the configuration of a car 101 including a radar apparatus according to a first embodiment of the present disclosure. The radar apparatus of the car 101 includes a transmitting antenna ANT1, a radar signal processing circuit 11, a spreading processing circuit 12, a radio transmitting circuit 13, a radio receiving circuit 14, a receiving antenna ANT2, a despreading processing circuit 15, an ID determination circuit 16, registers 17-0 and 17-1 to 17-N, and a selector 18.

The radar signal processing circuit 11 detects an object (for example, another car 102) which is located in a direction of forward movement of the car 101 (that is, a front direction of the car 101), on the basis of a radar signal transmitted and received by the radar apparatus of the car 101. The radar signal processing circuit 11 generates a trigger signal which gives an instruction to start transmission of a radar signal and sends the trigger signal to the spreading processing circuit 12 and the ID determination circuit 16. The spreading processing circuit 12 and the radio transmitting circuit 13 serve as a transmitting circuit which generates a radar signal and transmits the radar signal through the transmitting antenna ANT1. The spreading processing circuit 12 generates a spectrally spread baseband signal (that is, a spread signal) when the trigger signal is input from the radar signal processing circuit 11. The radio transmitting circuit 13 performs frequency conversion and power amplification on the baseband spread signal and generates a radio-frequency radar signal.

The transmitting antenna ANT1 and the receiving antenna ANT2 are fixed to a housing of the car 101 (or a housing of the radar apparatus provided in the car 101) and each have a beam direction, for example, in the vicinity of the direction of forward movement of the car 101. The expression "the vicinity of a direction" in this specification refers to a direction which forms, with the direction, an angle having an absolute value not less than 0 degree and less than 45 degrees. If a beam radiates out, the term "beam direction" in this specification refers to a direction of a central axis of the beam. An absolute value of an angle which each of the beam directions of the transmitting antenna ANT1 and the receiving antenna ANT2 forms with the direction of forward movement of the car 101 may be not less than 0 degree and less than 30 degrees, not less than 0 degree and less than 20 degrees, or not less than 0 degree and less than 10 degrees.

The radio receiving circuit 14 and the despreading processing circuit 15 serve as a receiving circuit which receives a radar signal reflected by an object through the receiving antenna ANT2. The radio receiving circuit 14 performs low-noise amplification and frequency conversion on a radar signal received by the receiving antenna ANT2 and generates a baseband output signal. The despreading processing circuit 15 performs despread spectrum processing on the output signal from the radio receiving circuit 14. The register 17-0 is a storage device storing an identification code unique to the radar apparatus of the car 101. The registers 17-1 to 17-N are storage devices storing a plurality of spread codes 1 to N, respectively, which are poorly correlated or not correlated with each other. The ID determination circuit 16 is a control circuit which controls the selector 18. The selector 18 selects one of the plurality of spread codes 1 to N and sends the one to the spreading processing circuit 12 and the despreading processing circuit 15 under control of the ID determination circuit 16.

The spreading processing circuit 12 and the radio transmitting circuit 13 generate a radar signal such that the radar signal has a plurality of periodic frames, each including first and second segments, when a trigger signal is input from the radar signal processing circuit 11. The first segment of each frame has a first spread signal which is obtained by multiplication of a predetermined reference signal (for example, a zero-value signal including continuous zero values) by at least a part of a selected spread code. The second segment of each frame has a second spread signal which is obtained by multiplication of the identification code by at least the part of the selected spread code.

Figure 2:
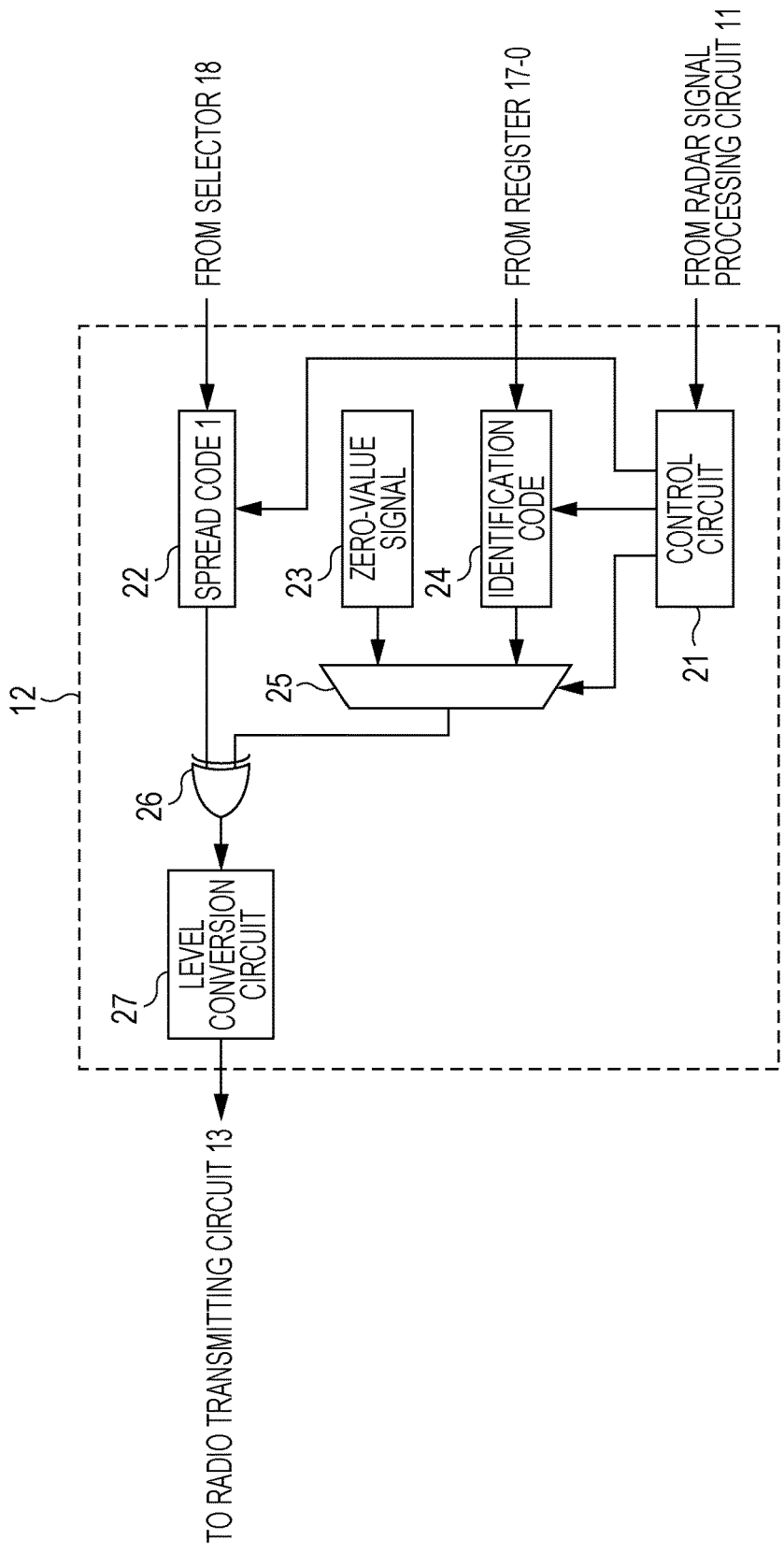
FIG. 2 is a block diagram showing the detailed configuration of a spreading processing circuit in FIG. 1.

FIG. 2 is a block diagram showing the detailed configuration of the spreading processing circuit 12 in FIG. 1. The spreading processing circuit 12 includes a control circuit 21, registers 22 to 24, a selector 25, an XOR gate 26, and a level conversion circuit 27. The control circuit 21 controls the registers 22 and 24 and the selector 25. The control circuit 21 starts generation of a radar signal by the spreading processing circuit 12 when a trigger signal from the radar signal processing circuit 11 is input. The register 22 stores the one of the spread codes 1 to N that is sent from the selector 18 (for example, the spread code 1 in FIG. 2), and sequentially outputs bits of the spread code in chronological order and sends the bits to the XOR gate 26 under control of the control circuit 21. The register 23 is a signal source which generates a zero-value signal including continuous zero values and sends the zero-value signal to the selector 25.

The register 24 stores the identification code sent from the register 17-0, and sequentially outputs bits of the identification code in chronological order and sends the bits to the selector 25 under control of the control circuit 21. The selector 25 sends one of the zero-value signal and the identification code to the XOR gate 26 under control of the control circuit 21. The XOR gate 26 outputs a result (a first spread signal) of an XOR operation between the spread code and the zero-value signal or a result (a second spread signal) of an XOR operation between the spread code and the identification code. Bits of the output signal from the XOR gate 26 are converted into a spread signal having a predetermined amplitude value by the level conversion circuit 27. The baseband spread signal output from the level conversion circuit 27 is sent to the radio transmitting circuit 13.

The despreading processing circuit 15 calculates a first correlation value between a received radar signal and a first spread signal and calculates a second correlation value between the received radar signal and a second spread signal.

Figure 3:
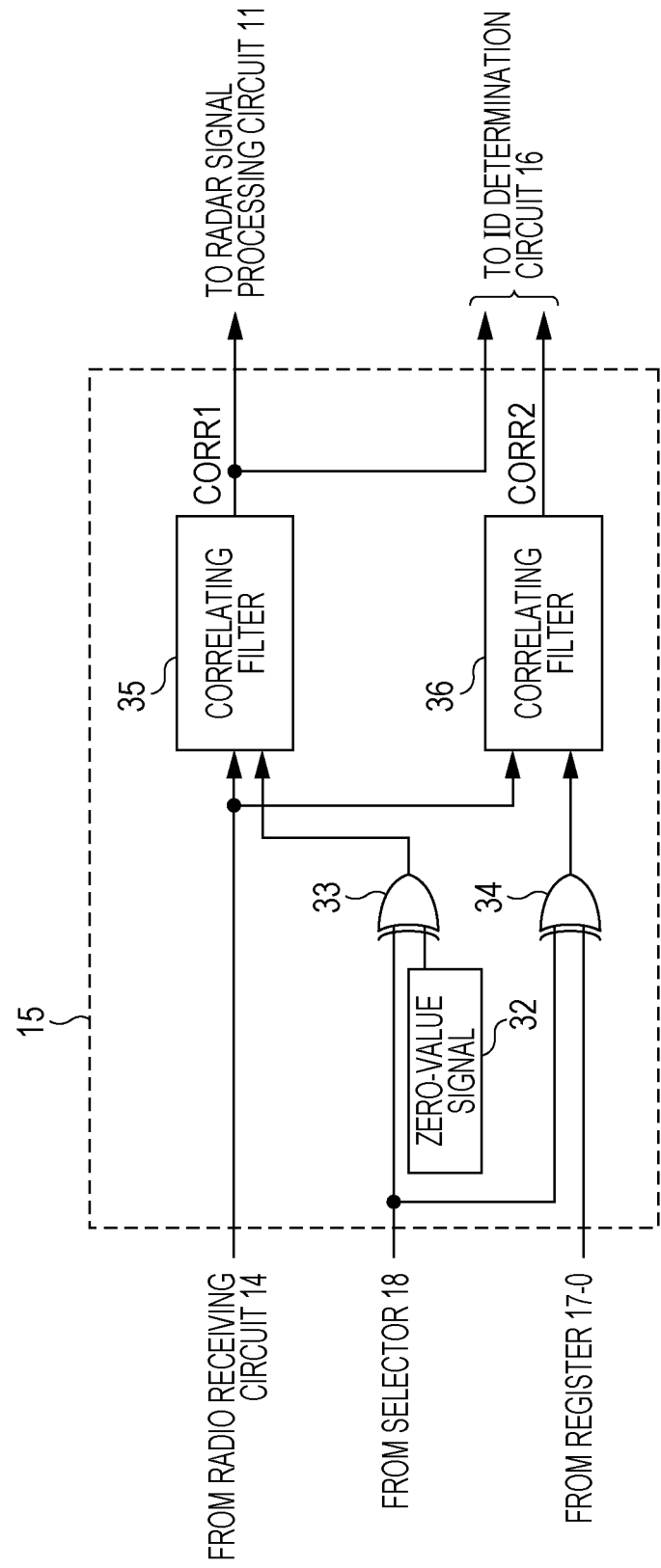
FIG. 3 is a block diagram showing the detailed configuration of a despreading processing circuit in FIG. 1.

FIG. 3 is a block diagram showing the detailed configuration of the despreading processing circuit 15 in FIG. 1. The despreading processing circuit 15 includes a register 32, XOR gates 33 and 34, and correlating filters 35 and 36. A baseband output signal from the radio receiving circuit 14 is input to the correlating filters 35 and 36. The register 32 is a signal source which generates a zero-value signal including continuous zero values and sends the zero-value signal to the XOR gate 33. The one of the spread codes 1 to N sent from the selector 18 (that is, the spread code identical to the spread code stored in the register 22 in FIG. 2) is also input to the XOR gate 33. The one of the spread codes 1 to N sent from the selector 18 and the identification code sent from the register 17-0 are input to the XOR gate 34.

The XOR gate 33 outputs a result (that is, a first spread signal) of an XOR operation between the spread code and the zero-value signal, and the output signal is set as a filter factor in the correlating filter 35. The XOR gate 34 outputs a result (that is, a second spread signal) of an XOR operation between the spread code and the identification code, and the output signal is set as a filter factor in the correlating filter 36. For example, if the spread code is N bits long, N filter factors C1 to CN are set in each of the correlating filters 35 and 36. If an n-th bit ($1 \leq n \leq N$) of the spread code is '0', the filter factor Cn is set to $-1$. On the other hand, if the n-th bit is '1', the filter factor Cn is set to 1. The correlating filter 35 outputs a correlation signal CORR1 indicating a correlation value between a received radar signal (that is, the signal output from the radio receiving circuit 14) and the first spread signal and sends the correlation signal CORR1 to the radar signal processing circuit 11 and the ID determination circuit 16. The correlating filter 36 outputs a correlation signal CORR2 indicating a correlation value between the received radar signal and the second spread signal and sends the correlation signal CORR2 to the ID determination circuit 16.

The ID determination circuit 16 controls the selector 18 to select one of the plurality of spread codes 1 to N on the basis of the temporal positions and the magnitudes of peaks of the first and second correlation values in each frame of a radar signal.

Figure 4:
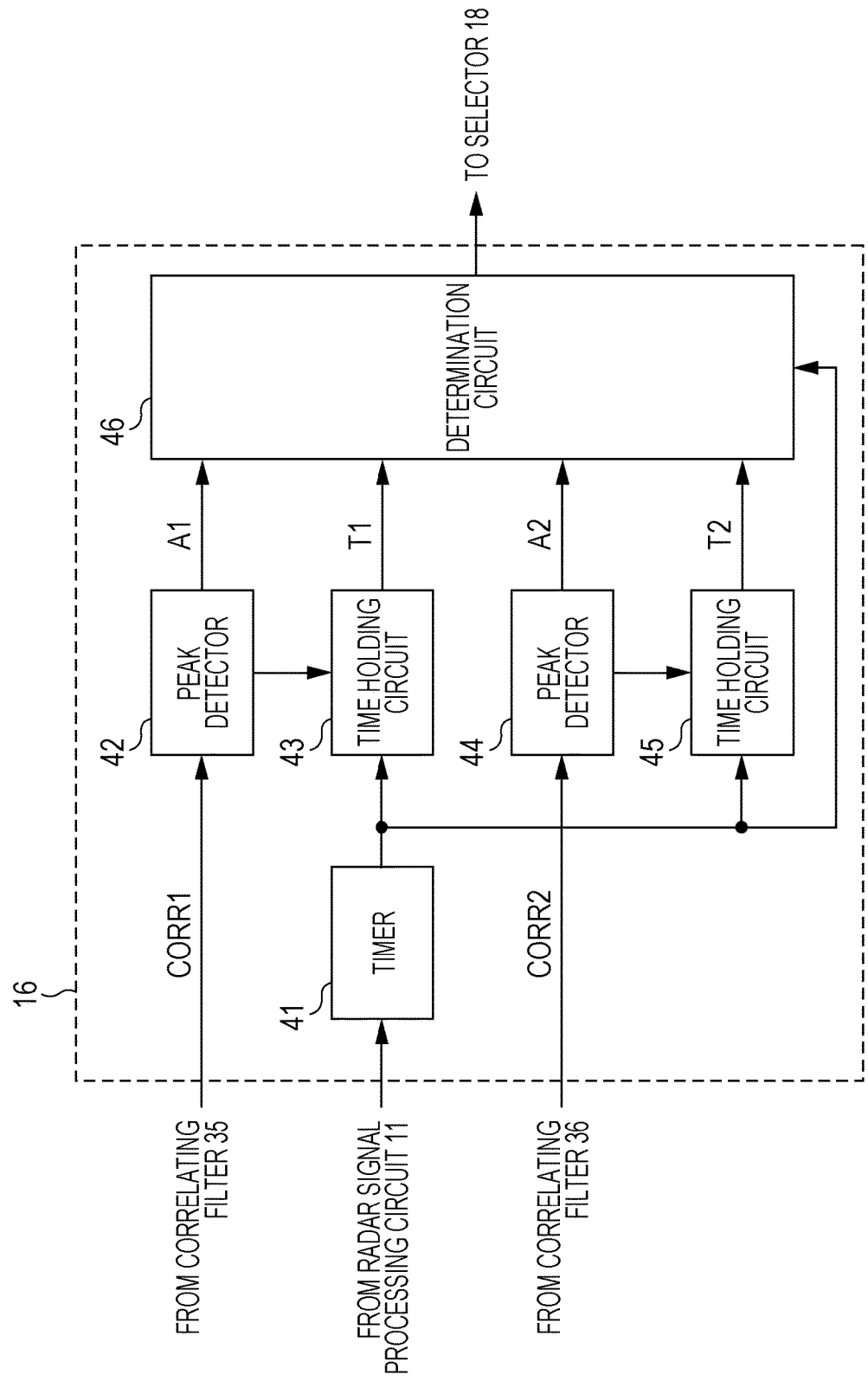
FIG. 4 is a block diagram showing the detailed configuration of an ID determination circuit in FIG. 1.

FIG. 4 is a block diagram showing the detailed configuration of the ID determination circuit 16 in FIG. 1. The ID determination circuit 16 includes a timer 41, peak detectors 42 and 44, time holding circuits 43 and 45, and a determination circuit 46. The timer 41 starts counting up and incrementing a timer value when transmission of a radar signal is started (that is, when a trigger signal is input from the radar signal processing circuit 11). The timer 41 sends the timer value to the time holding circuits 43 and 45 and the determination circuit 46. The peak detector 42 detects a magnitude A1 of a peak of the correlation signal CORR1 in each frame, and the time holding circuit 43 detects a temporal position T1 of the peak of the correlation signal CORR1. The peak of the correlation signal CORR1 indicates that the received radar signal includes a first spread signal (that is, a zero-value signal).

The peak detector 44 detects a magnitude A2 of a peak of the correlation signal CORR2 in each frame, and the time holding circuit 45 detects a temporal position T2 of the peak of the correlation signal CORR2. The peak of the correlation signal CORR2 indicates that the received radar signal includes a second spread signal (that is, the identification code of the radar apparatus of the car 101). A peak of each correlation signal is, for example, a power peak of the correlation signal. If each correlation signal is a complex signal I+jQ, a power peak of the correlation signal is given by $I^2+Q^2$. The determination circuit 46 executes a spread code selection process in FIG. 5 on the basis of the temporal positions and the magnitudes of peaks of the first and second correlation values in each frame.

Figure 5:
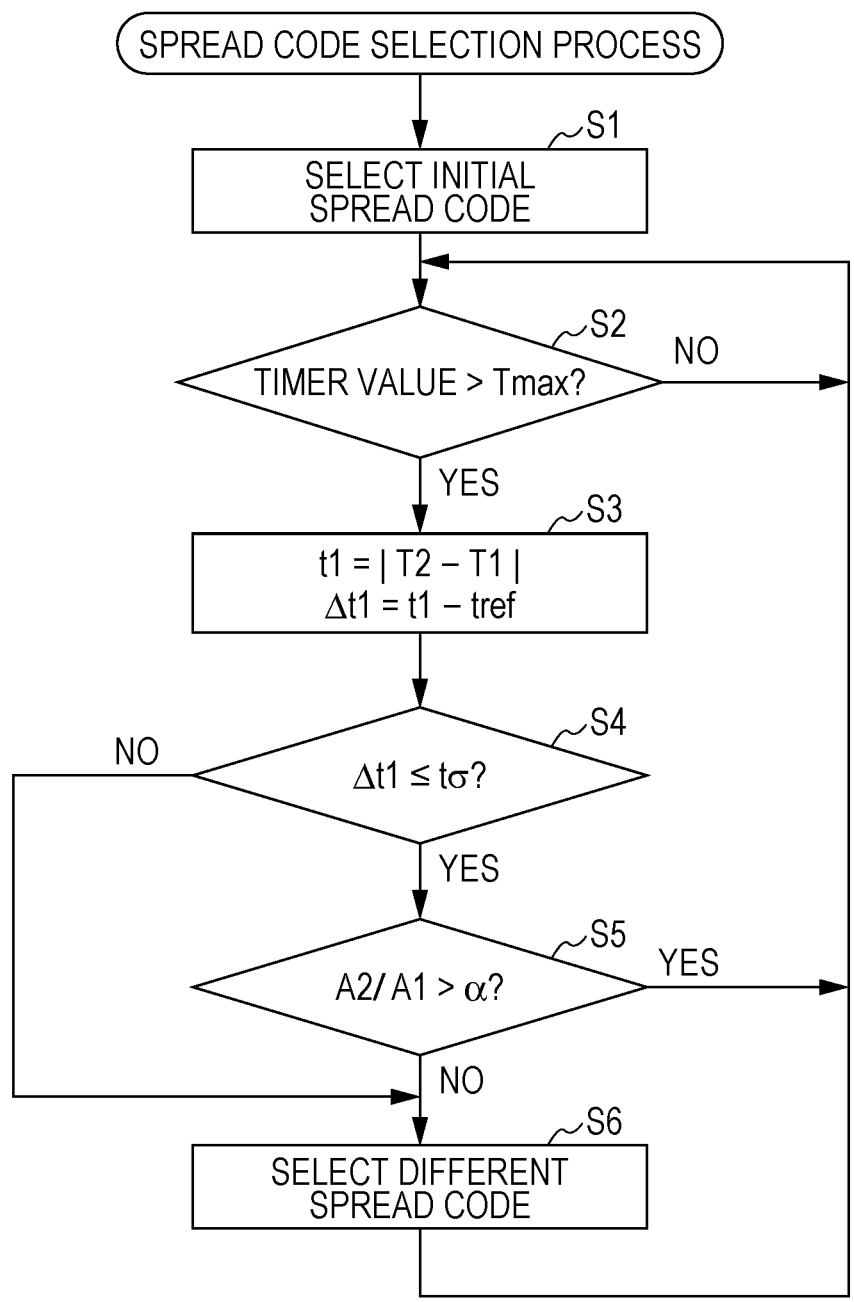
FIG. 5 is a flowchart showing a spread code selection process to be executed by a determination circuit in FIG. 4.

FIG. 5 is a flowchart showing a spread code selection process to be executed by the determination circuit 46 in FIG. 4. In step S1, the determination circuit 46 selects an arbitrary one of the spread codes 1 to N (that is, an initial spread code). The selected spread code is set in the spreading processing circuit 12 and in the despreading processing circuit 15. The spreading processing circuit 12 and the radio transmitting circuit 13 generate a radio-frequency radar signal and transmit the radar signal through the transmitting antenna ANT1. The radio receiving circuit 14 and the despreading processing circuit 15 receive the radar signal reflected by an object through the receiving antenna ANT2.

In step S2, the determination circuit 46 judges whether the timer value has exceeded a predetermined threshold Tmax. If YES, the flow advances to step S3; otherwise, step S2 is repeated. The threshold Tmax represents a time period from when a radar signal is transmitted to when the radar signal reflected by an object is received, and measurement ends. The time period depends on the length of one frame of a radar signal and a maximum measurable distance of the radar apparatus. For example, if the length of one frame is 1 msec, the maximum measurable distance is 10 m (the round-trip distance from the radar apparatus to an object is thus 10 m×2), and the speed of light is $3.0×10^{-8}$ m/s, the threshold Tmax is given by:

$$Tmax = 1 \text{ msec} + 10 \text{ m} \times 2 \div (3.0 \times 10^{-8} \text{ m/s})$$
$$= 1.000067 \text{ msec.}$$

In step S3, the determination circuit 46 calculates a time difference t1=|T2−T1| between peaks of the correlation values and calculates an error Δt1=t1−tref of the time difference t1 with respect to a reference time difference tref measured in advance. The reference time difference tref here is determined in advance by the positions and the durations of a first spread signal (that is, a portion corresponding to a zero-value signal) and a second spread signal (that is, a portion corresponding to an identification code) in each frame. Detection of peaks of the correlation values with a time difference equal to the reference time difference tref indicates that an identification code included in a received radar signal coincides with the identification code of the radar apparatus of the car 101. If the identification codes coincide, the received radar signal is not an interference wave and is a radar signal which is transmitted from the radar apparatus of the car 101 and reflected by an object. On the other hand, if the identification codes do not coincide, the received radar signal is an interference wave which is transmitted from another radar apparatus.

In step S4, the determination circuit 46 judges whether the error Δt1 falls within a measurement variation range tδ. If YES, the flow advances to step S5; otherwise, the flow advances to step S6. If YES in step S4, that is, if the time difference t1 between peaks of the correlation values coincides with the reference time difference tref within the measurement variation range tδ, the identification code of the received radar signal is judged to coincide with the identification code of a transmitted radar signal. On the other hand, if NO in step S4, the identification code of the received radar signal is not the identification code of the transmitted radar signal. In this case, the received radar signal may have been transmitted by, for example, another radar apparatus using the same spread code as the radar apparatus of the car 101.

In step S5, the determination circuit 46 judges whether the ratio between the magnitudes of peaks of the correlation values, A2/A1, exceeds a predetermined threshold α. If YES, the flow returns to step S2; otherwise, the flow advances to step S6. The threshold α indicates reception credibility. As described earlier, a peak of the correlation signal CORR1 indicates that a received radar signal includes a first correlation signal (that is, a zero-value signal), and a peak of the correlation signal CORR2 indicates that a received radar signal includes a second correlation signal (that is, the identification code of the radar apparatus of the car 101). Thus, if at least one different radar apparatus using the same spread code as the radar apparatus of the car 101 is present, and the radar apparatuses transmit radar signals at the same time, first spread signals (including zero-value signals) of the radar signals transmitted from the radar apparatuses are indistinguishable from each other, but second spread signals (including identification codes of the radar apparatuses) of the radar signals transmitted from the radar apparatuses are different from each other.

In this case, the correlation value peak magnitude A1 is obtained through superposition of components derived from the first spread signals of the radar signals transmitted from the radar apparatuses while the correlation value peak magnitude A2 is obtained only from the second spread signal of the radar signal transmitted from the radar apparatus of the car 101. If the correlation value peak magnitude ratio A2/A1 is large, it is judged that there is no interference wave other than the radar signal transmitted from the radar apparatus of the car 101. On the other hand, if the correlation value peak magnitude ratio A2/A1 is small, it is judged that there is an interference wave. If YES in step S5, that is, if the correlation value peak magnitude ratio A2/A1 is larger than the reception credibility α, it is judged that it is highly credible that the received radar signal is a radar signal transmitted from the radar apparatus of the car 101, that is, that the currently used spread code is causing no interference. If NO in step S5, it is judged that it is less credible that the received radar signal is a radar signal transmitted from the radar apparatus of the car 101, that is, that the currently used spread code is causing interference.

If NO in step S4 or step S5, the determination circuit 46 selects a different one of the spread codes 1 to N in step S6 in order to select a different spread code causing no interference for transmission and reception of a radar signal, and the flow returns to step S2.

As described above, if the error $\Delta t1$ of the time difference t1 between peaks of the first and second correlation values with respect to the predetermined reference time difference tref falls within the predetermined measurement variation range $t\delta$, and the ratio of the magnitude of a peak of the second correlation value with the magnitude of a peak of the first correlation value, A2/A1, exceeds the predetermined threshold $\alpha$, in each frame of a radar signal, the determination circuit 46 judges that a currently used spread code is causing no interference and controls the selector 18 such that the currently selected spread code is not changed. If the error $\Delta t1$ of the time difference t1 between peaks of the first and second correlation values with respect to the predetermined reference time difference tref falls outside the predetermined measurement variation range $t\delta$ or if the ratio of the magnitude of a peak of the second correlation value with the magnitude of a peak of the first correlation value, A2/A1, is not more than the predetermined threshold $\alpha$, in each frame of the radar signal, the determination circuit 46 judges that the currently used spread code is causing interference and controls the selector 18 to select a spread code different from the currently selected spread code.

When a radar signal is generated using a spread code which causes no interference, the radar signal processing circuit 11 detects an object (for example, the different car 102) located in the direction of forward movement (the front direction) of the car 101 on the basis of the correlation signal CORR1 sent from the despreading processing circuit 15. Generation of a radar signal using a spread code which causes no interference allows the radar signal processing circuit 11 to reliably detect an object located in the direction of forward movement of the car 101. If a currently used spread code is causing interference, the radar signal processing circuit 11 may cancel detection of an object located in the direction of forward movement of the car 101. For this reason, the determination circuit 46 may instruct the radar signal processing circuit 11 in step S6 to cancel object detection using the correlation signal CORR1.

Figure 6:
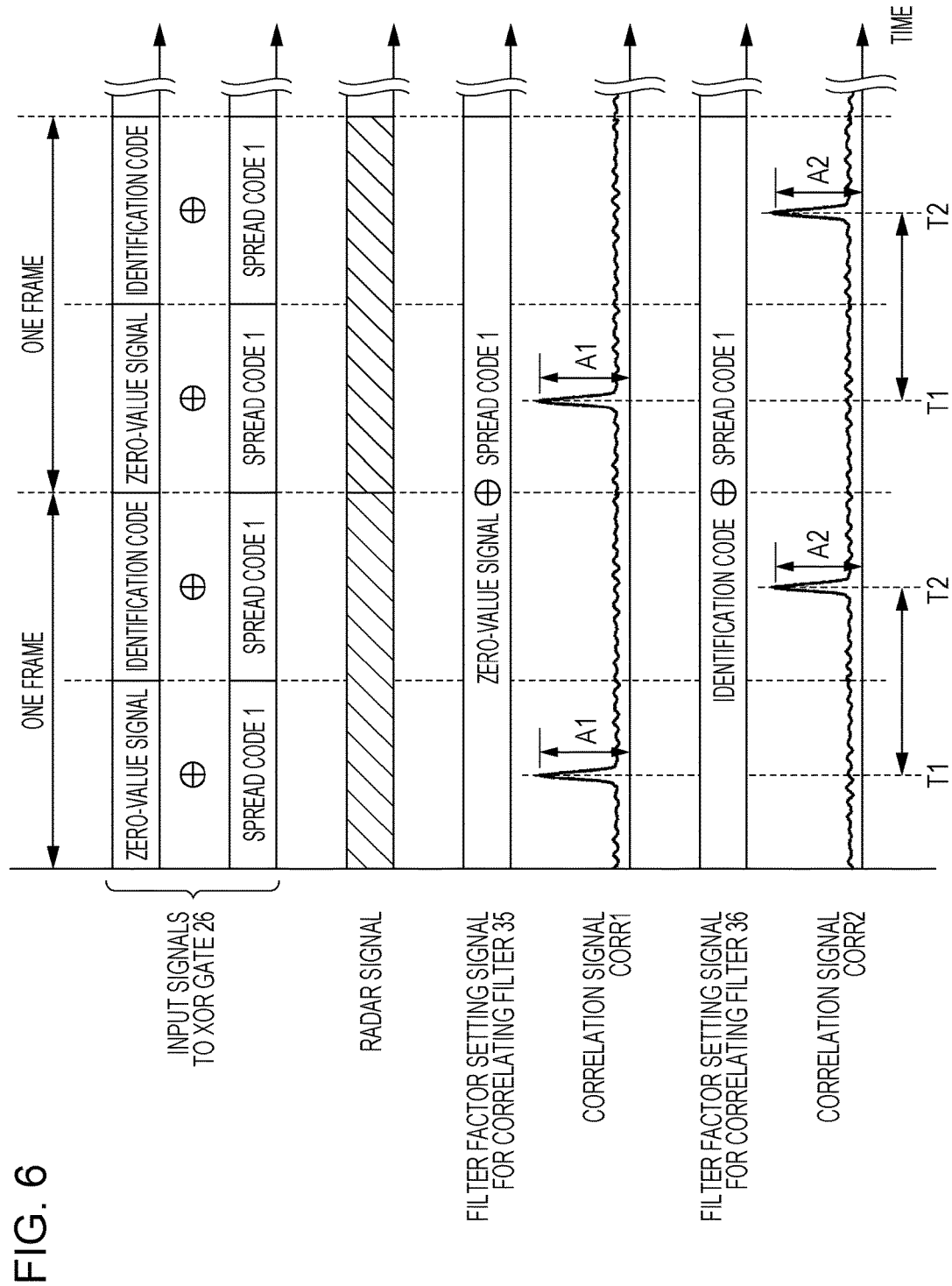
FIG. 6 is a timing diagram showing signals at portions in the radar apparatus of the car in FIG. 1.

FIG. 6 is a timing diagram showing signals at portions in the radar apparatus of the car 101 in FIG. 1. In a first segment (for example, a first-half segment) of each frame of a radar signal, a first spread signal is generated by multiplication of a zero-value signal by the whole of a selected spread code (for example, the spread code 1 in FIG. 6), that is, by carrying out an XOR operation between the spread code and the zero-value signal. In a second segment (for example, a second-half segment) of each frame of the radar signal, a second spread signal is generated by multiplication of the identification code by the whole of the selected spread code, that is, by carrying out an XOR operation between the spread code and the identification code.

The spreading processing circuit 12 and the despreading processing circuit 15 each internally generate a first spread signal and a second spread signal. The spreading processing circuit 12 sends a first spread signal and a second spread signal to the radio transmitting circuit 13. The despreading processing circuit 15 sets a first spread signal and a second spread signal as filter factors in the correlating filters 35 and 36 (filter factor setting signals for the correlating filters 35 and 36). The despreading processing circuit 15 outputs the correlation signal CORR1 indicating a correlation value between a received radar signal and the filter factor setting signal for the correlating filter 35 and outputs the correlation signal CORR2 indicating a correlation value between the received radar signal and the filter factor setting signal for the correlating filter 36.

If an identification code is shorter than a spread code in a second segment of each frame of a radar signal, the spreading processing circuit 12 and the despreading processing circuit 15 each pad a remaining space with, for example, zero values to generate a second spread signal. If the identification code is longer than the spread code in a second segment of each frame of the radar signal, the spreading processing circuit 12 and the despreading processing circuit 15 each generate a second spread signal by multiplication of the identification code by two or more repetitions of the spread code.

Figure 7:
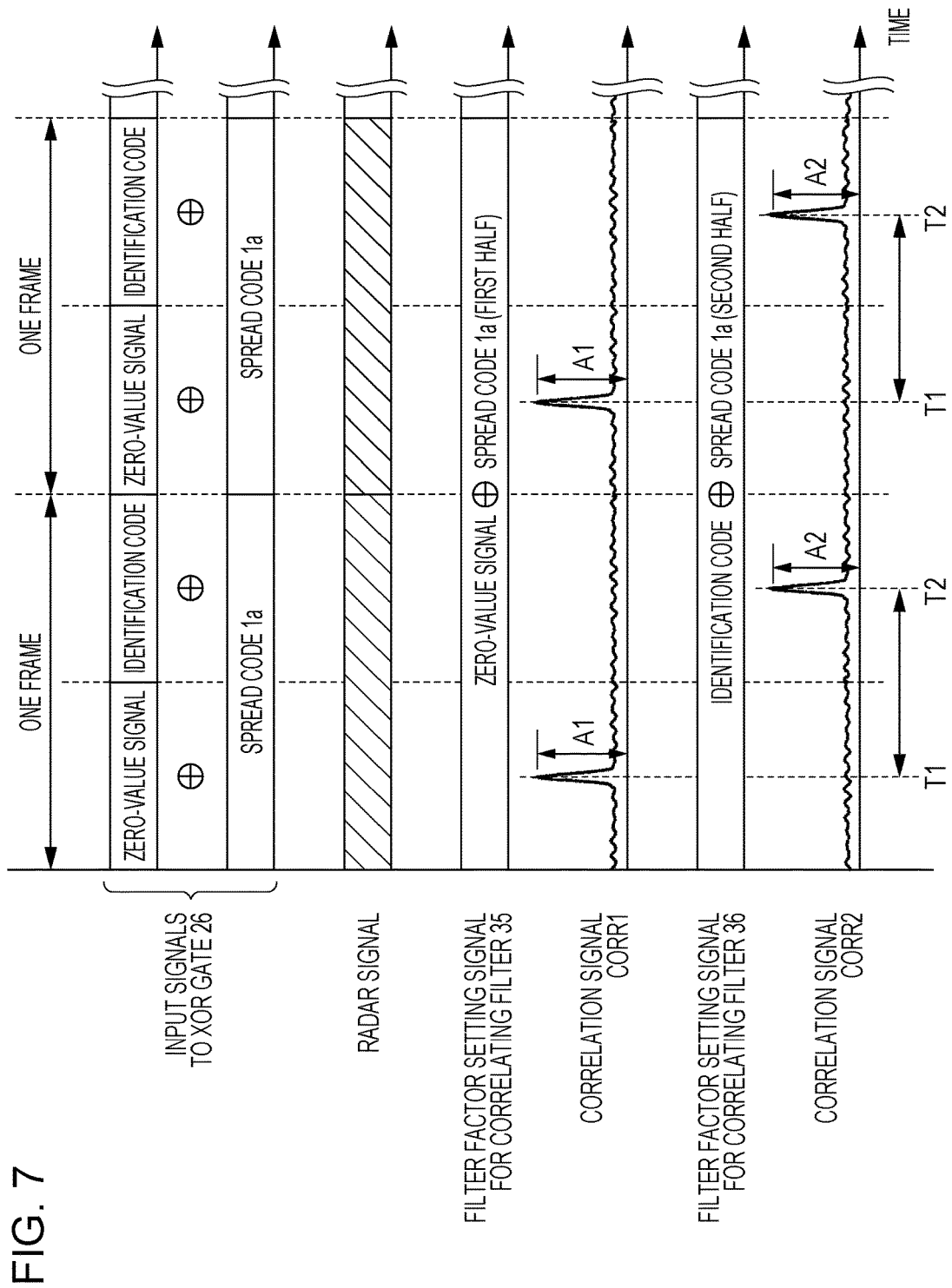
FIG. 7 is a timing diagram showing signals at portions in a radar apparatus according to a modification of the first embodiment of the present disclosure.

FIG. 7 is a timing diagram showing signals at portions in a radar apparatus according to a modification of the first embodiment of the present disclosure. Each frame of a radar signal may have a length equal to the length of the whole of a selected spread code (for example, a spread code 1*a* in FIG. 7). In this case, the selected spread code includes a first portion corresponding to a first segment (for example, a first-half segment) of each frame and a second portion corresponding to a second segment (for example, a second-half segment) of the frame. In a first segment of each frame, a first spread signal is generated by multiplication of a zero-value signal by the first portion of the selected spread code, that is, by carrying out an XOR operation between the first portion of the spread code and the zero-value signal. In a second segment of each frame, a second spread signal is generated by multiplication of an identification code by the second portion of the selected spread code, that is, by carrying out an XOR operation between the second portion of the spread code and the identification code.

Although first and second segments of each frame of a radar signal are shown in FIG. 7 to have equal lengths, the lengths of first and second segments of each frame may be different from each other. Although the timing diagrams in FIGS. 6 and 7 each illustrate a case where frames are continuously transmitted, frames may be transmitted at time intervals corresponding to a propagation time for twice a maximum measurable distance of the radar apparatus in view of the maximum measurable distance. This allows prevention of interference occurring between frames of a radar signal transmitted from the radar apparatus itself of the car 101. A radar apparatus may be provided not only in the car 101 but also in any other vehicle. The transmitting antenna ANT1 and the receiving antenna ANT2 may be non-directional. A reference signal to be multiplied by a spread code in a first segment of each frame of a radar signal is not limited to a zero-value signal and may be a signal having a fixed value of '1' over a first segment of each frame. Alternatively, the reference signal may be any other signal including a pattern of 0's and 1's.

According to the present embodiment, it is possible to provide a radar apparatus using a new principle which is applicable to a pulse radar apparatus using a spread spectrum code and is intended to detect and prevent interference of a radar signal without the need for advance synchronization and complicated processing.

Second Embodiment

Figure 8:
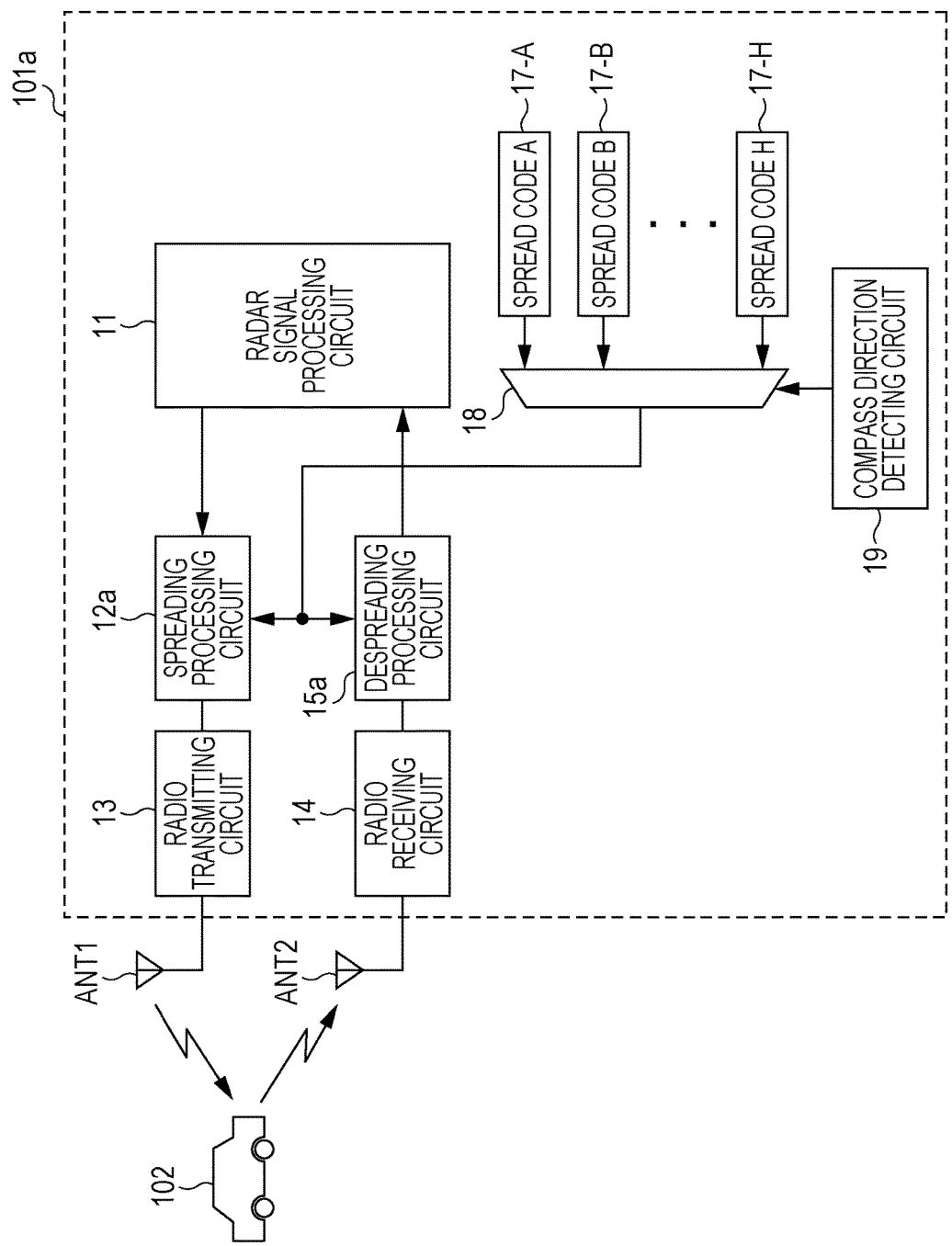
FIG. 8 is a block diagram showing the configuration of a car including a radar apparatus according to a second embodiment of the present disclosure.

FIG. 8 is a block diagram showing the configuration of a car 101*a* including a radar apparatus according to a second embodiment of the present disclosure. The radar apparatus of the car 101*a* includes a transmitting antenna ANT1, a receiving antenna ANT2, a radar signal processing circuit 11, a spreading processing circuit 12*a*, a radio transmitting circuit 13, a radio receiving circuit 14, a despreading processing circuit 15*a*, registers 17-A to 17-H, a selector 18, and a compass direction detecting circuit 19.

The radar signal processing circuit 11 detects an object (for example, another car 102) located in a direction of forward movement (that is, a front direction) of the car 101*a* on the basis of a transmitted and received radar signal. The compass direction detecting circuit 19 is a sensor, such as a GPS, and detects an azimuth angle for a front direction of a housing of the car 101*a* (or a housing of the radar apparatus provided in the car 101*a*). The spreading processing circuit 12*a* and the radio transmitting circuit 13 serve as a transmitting circuit which generates a radar signal and transmits the radar signal through the transmitting antenna ANT1. The transmitting antenna ANT1 and the receiving antenna ANT2 are fixed to the housing of the car 101*a* or the radar apparatus and each have a beam direction, for example, in the vicinity of the direction of forward movement of the car 101*a*. The radio receiving circuit 14 and the despreading processing circuit 15*a* serve as a receiving circuit which receives a radar signal reflected by an object through the receiving antenna ANT2. The registers 17-A to 17-H are storage devices storing a plurality of spread codes A to H, respectively, which are poorly correlated or not correlated with each other and are associated with a plurality of azimuth angles different from each other. The selector 18 selects one of the plurality of spread codes A to H and sends the one to the spreading processing circuit 12*a* and the despreading processing circuit 15*a* under control of the compass direction detecting circuit 19.

Figure 9:
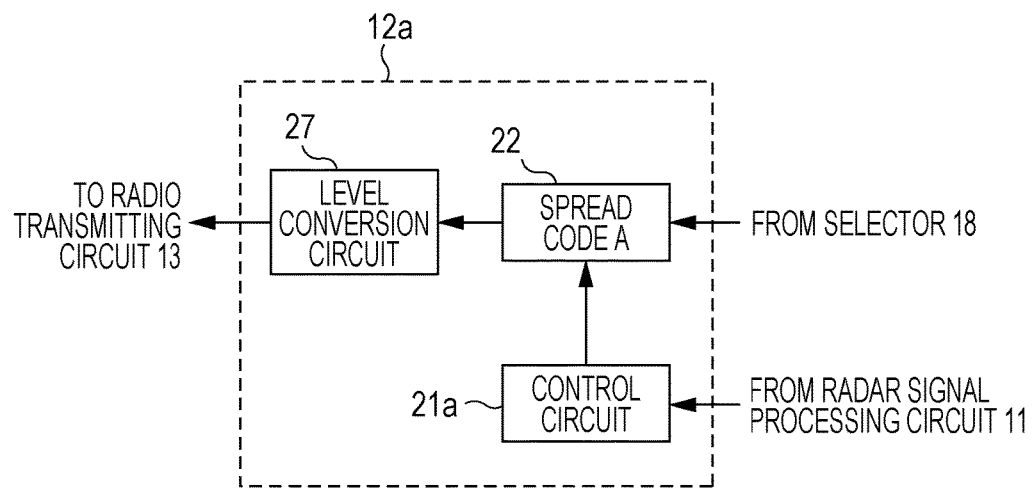
FIG. 9 is a block diagram showing the detailed configuration of a spreading processing circuit in FIG. 8.

FIG. 9 is a block diagram showing the detailed configuration of the spreading processing circuit 12*a* in FIG. 8. The spreading processing circuit 12*a* includes a control circuit 21*a*, a register 22, and a level conversion circuit 27. The control circuit 21*a* controls the register 22. The control circuit 21*a* starts generation of a radar signal by the spreading processing circuit 12*a* when a trigger signal from the radar signal processing circuit 11 is input. The register 22 stores the one of the spread codes A to H that is sent from the selector 18 (for example, the spread code A in FIG. 9), and sequentially outputs bits of the spread code in chronological order and sends the bits to the level conversion circuit 27 under control of the control circuit 21*a*. The level conversion circuit 27 in FIG. 9 is the same as the corresponding component in FIG. 2.

Figure 10:
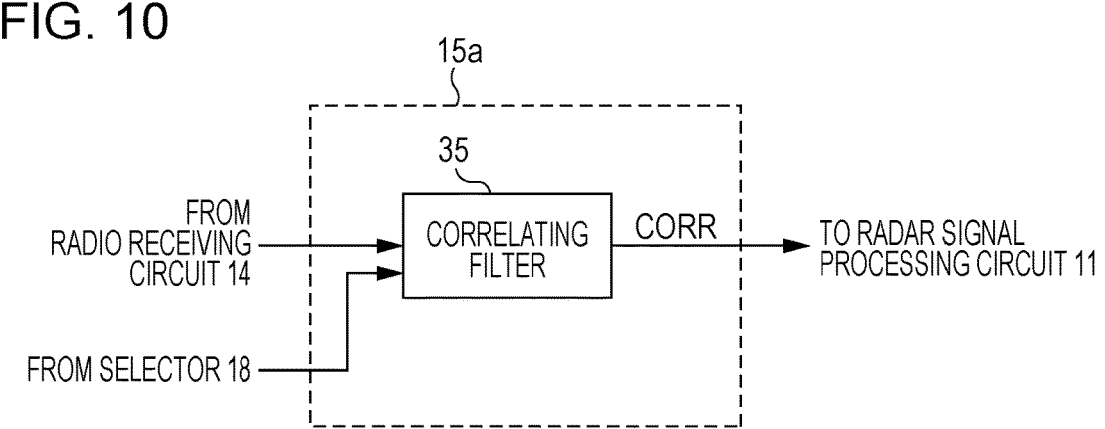
FIG. 10 is a block diagram showing the detailed configuration of a despreading processing circuit in FIG. 8.

FIG. 10 is a block diagram showing the detailed configuration of the despreading processing circuit 15*a* in FIG. 8. The despreading processing circuit 15*a* includes a correlating filter 35. A baseband output signal from the radio receiving circuit 14 is input to the correlating filter 35. The one of the spread codes A to H sent from the selector 18 (for example, the spread code identical to the spread code stored in the register 22 in FIG. 9) is also set as a filter factor in the correlating filter 35. The correlating filter 35 outputs a correlation signal CORR indicating a correlation value between a received radar signal (that is, the output signal from the radio receiving circuit 14) and the spread code and sends the correlation signal CORR to the radar signal processing circuit 11.

The spreading processing circuit 12*a* generates a spectrally spread baseband signal (that is, a spread signal) when the trigger signal is input from the radar signal processing circuit 11. The radio transmitting circuit 13 performs frequency conversion and power amplification on the baseband spread signal and generates a radio-frequency radar signal. That is, the spreading processing circuit 12*a* and the radio transmitting circuit 13 generate a radar signal spectrally spread by the selected spread code and send the radar signal as a radio-frequency radar signal through the transmitting antenna ANT1. The radio receiving circuit 14 performs low-noise amplification and frequency conversion on a radar signal received by the receiving antenna ANT2 and generates a baseband output signal. The despreading processing circuit 15*a* performs despread spectrum processing on the output signal from the radio receiving circuit 14. That is, the radio receiving circuit 14 and the despreading processing circuit 15*a* perform despread spectrum processing on the radio-frequency radar signal received by the receiving antenna ANT2 using the selected spread code.

Figure 11:
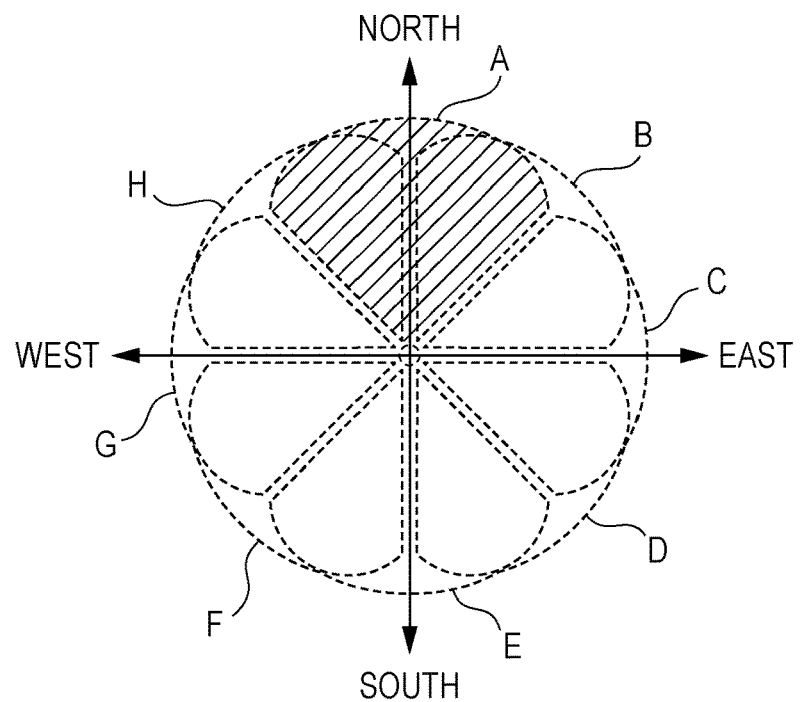
FIG. 11 is a top view showing beam patterns corresponding to spread codes in FIG. 8.

FIG. 11 is a top view showing beam patterns corresponding to the spread codes A to H in FIG. 8. The plurality of spread codes A to H are poorly correlated or not correlated with each other and are associated with the plurality of azimuth angles different from each other. The selector 18 selects a spread code associated with an azimuth angle for a direction in the vicinity of the front direction of the housing of the car 101*a* or the radar apparatus under control of the compass direction detecting circuit 19. For example, the selector 18 selects the spread code A when the car 101*a* is moving in a northward direction and selects the spread code E when the car 101*a* is moving in a southward direction.

Figure 12:
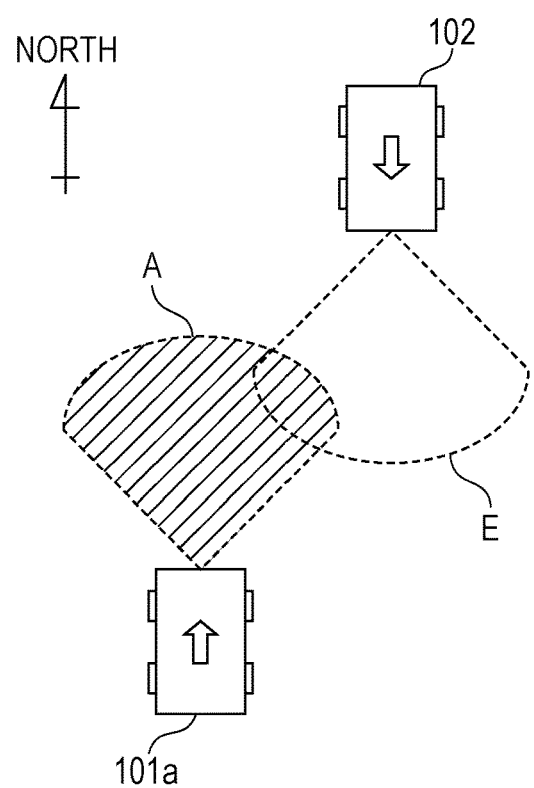
FIG. 12 is a top view showing a beam pattern when the cars in FIG. 8 approach each other as cars moving in opposite directions.

FIG. 12 is a top view showing a beam pattern when the car 101*a* and the car 102 in FIG. 8 approach each other as cars moving in opposite directions. Referring to FIG. 12, the car 101*a* is moving in the northward direction, and the radar apparatus of the car 101*a* transmits a radar signal spectrally spread by the spread code A. The car 102 is moving in the southward direction, and a radar apparatus of the car 102 transmits a radar signal spectrally spread by the spread code E. Since the plurality of spread codes are poorly correlated or not correlated with each other, the radar apparatuses of the cars 101*a* and 102 can each detect an object around the car with high accuracy without interference of a radar signal from the other radar apparatus.

Figure 13:
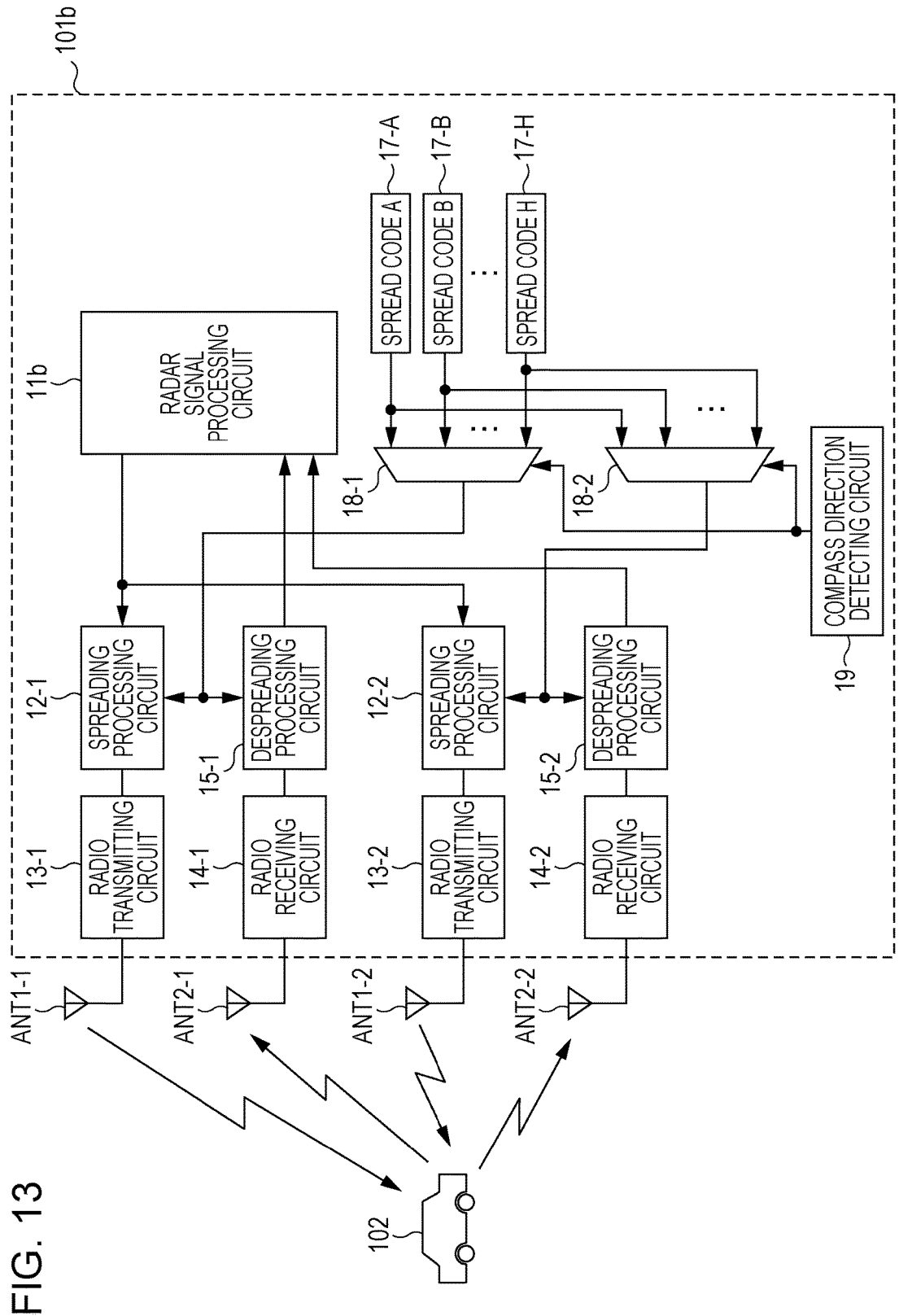
FIG. 13 is a block diagram showing the configuration of a car including a radar apparatus according to a modification of the second embodiment of the present disclosure.

FIG. 13 is a block diagram showing the configuration of a car 101*b* including a radar apparatus according to a modification of the second embodiment of the present disclosure. The radar apparatus may simultaneously transmit a plurality of radar signals having beam directions different from each other in the vicinity of a front direction of a housing of the radar apparatus. The radar apparatus of the car 101*b* includes two radar apparatus portions. One radar apparatus portion includes a transmitting antenna ANT1-1, a receiving antenna ANT2-1, a spreading processing circuit 12-1, a radio transmitting circuit 13-1, a radio receiving circuit 14-1, a despreading processing circuit 15-1, and a selector 18-1. The other radar apparatus portion includes a transmitting antenna ANT1-2, a receiving antenna ANT2-2, a spreading processing circuit 12-2, a radio transmitting circuit 13-2, a radio receiving circuit 14-2, a despreading processing circuit 15-2, and a selector 18-2. The transmitting antenna, the receiving antenna, the spreading processing circuit, the radio transmitting circuit, the radio receiving circuit, the despreading processing circuit, and the selector of each radar apparatus portion are the same as the corresponding components in FIG. 8. The two radar apparatus portions have respective beam directions different from each other in the vicinity of the front direction of the housing. The selectors 18-1 and 18-2 of the radar apparatus portions each select a spread code associated with an azimuth angle for a direction in the vicinity of the beam direction of the radar apparatus portion. The radar apparatus of the car 101*b* further includes a radar signal processing circuit 11*b*, the registers 17-A to 17-H, and the compass direction detecting circuit 19, and the components are the same as the corresponding components in FIG. 8.

Figure 14:
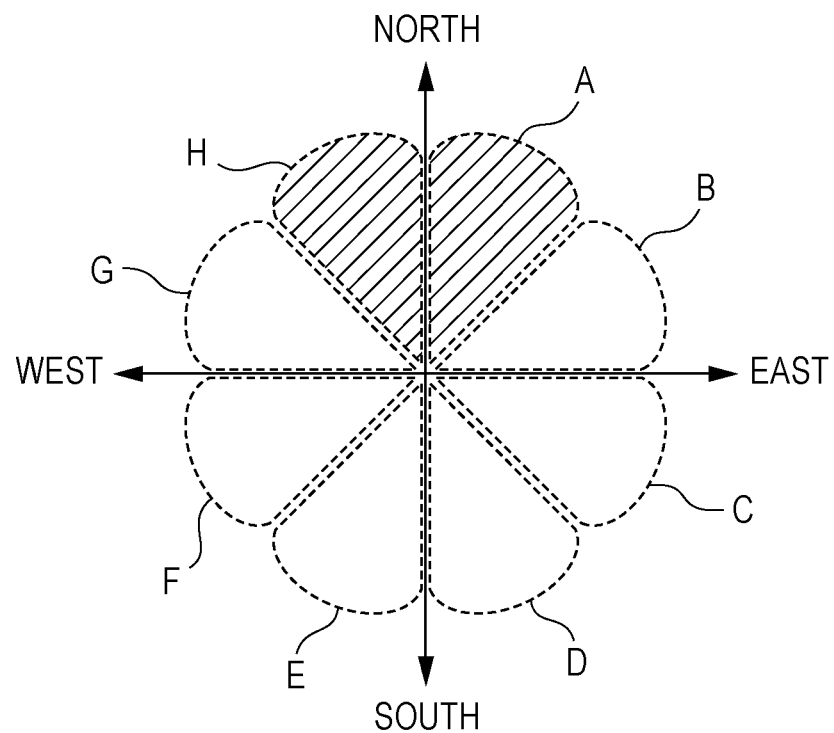
FIG. 14 is a top view showing beam patterns corresponding to spread codes in FIG. 13.

FIG. 14 is a top view showing beam patterns corresponding to spread codes A to H in FIG. 13. The plurality of spread codes A to H are poorly correlated or not correlated with each other and are associated with a plurality of azimuth angles different from each other. The selector 18-1 selects a spread code associated with an azimuth angle for a direction in the vicinity of the beam direction for the transmitting antenna ANT1-1 and the receiving antenna ANT2-1. The selector 18-2 selects a spread code associated with an azimuth angle for a direction in the vicinity of the beam direction for the transmitting antenna ANT1-2 and the receiving antenna ANT2-2. For example, when the car 101*b* is moving in a northward direction, the transmitting antenna ANT1-1 and the receiving antenna ANT2-1 have a beam direction which is the north-northeast, the transmitting antenna ANT1-2 and the receiving antenna ANT2-2 have a beam direction which is the north-northwest, the selector 18-1 selects the spread code A, and the selector 18-2 selects the spread code H. Similarly, for example, when the car 101*b* is moving in a southward direction, the transmitting antenna ANT1-1 and the receiving antenna ANT2-1 have a beam direction which is the south-southwest, the transmitting antenna ANT1-2 and the receiving antenna ANT2-2 have a beam direction which is south-southeast, the selector 18-1 selects the spread code E, and the selector 18-2 selects the spread code D.

Figure 15:
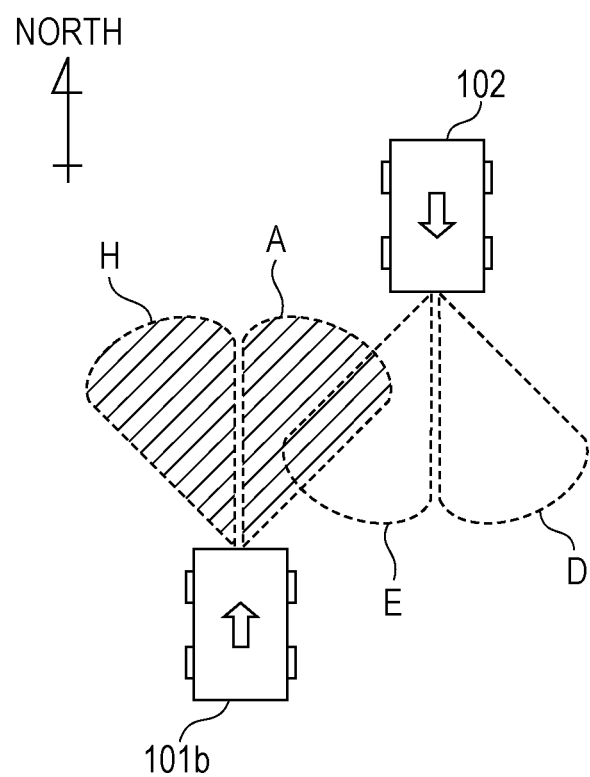
FIG. 15 is a top view showing a beam pattern when the cars in FIG. 13 approach each other as cars moving in opposite directions.

FIG. 15 is a top view showing a beam pattern when the car 101*b* and the car 102 in FIG. 13 approach each other as cars moving in opposite directions. Referring to FIG. 15, the car 101*b* is moving in the northward direction, and the radar apparatus of the car 101*b* transmits a radar signal spectrally spread by the spread code A and a radar signal spectrally spread by the spread code H. The car 102 is moving in the southward direction, and a radar apparatus of the car 102 transmits a radar signal spectrally spread by the spread code D and a radar signal spectrally spread by the spread code E. Since the spread codes for radar signals of the cars moving in the opposite directions are poorly correlated or not correlated with each other, the radar apparatuses of the cars 101*b* and 102 can each detect an object around the car with high accuracy without interference of a radar signal from the other radar apparatus.

A radar apparatus may include three or more radar apparatus portions. Each of the plurality of radar apparatus portions includes a transmitting antenna, a receiving antenna, a spreading processing circuit, a radio transmitting circuit, a radio receiving circuit, a despreading processing circuit, and a selector, like the radar apparatus of the car 101*b*. According to the present embodiment, it is possible to provide a radar apparatus using a new principle which is applicable to a pulse radar apparatus using a spread spectrum code and is intended to detect and prevent interference of a radar signal without the need for advance synchronization and complicated processing.

Third Embodiment

Figure 16:
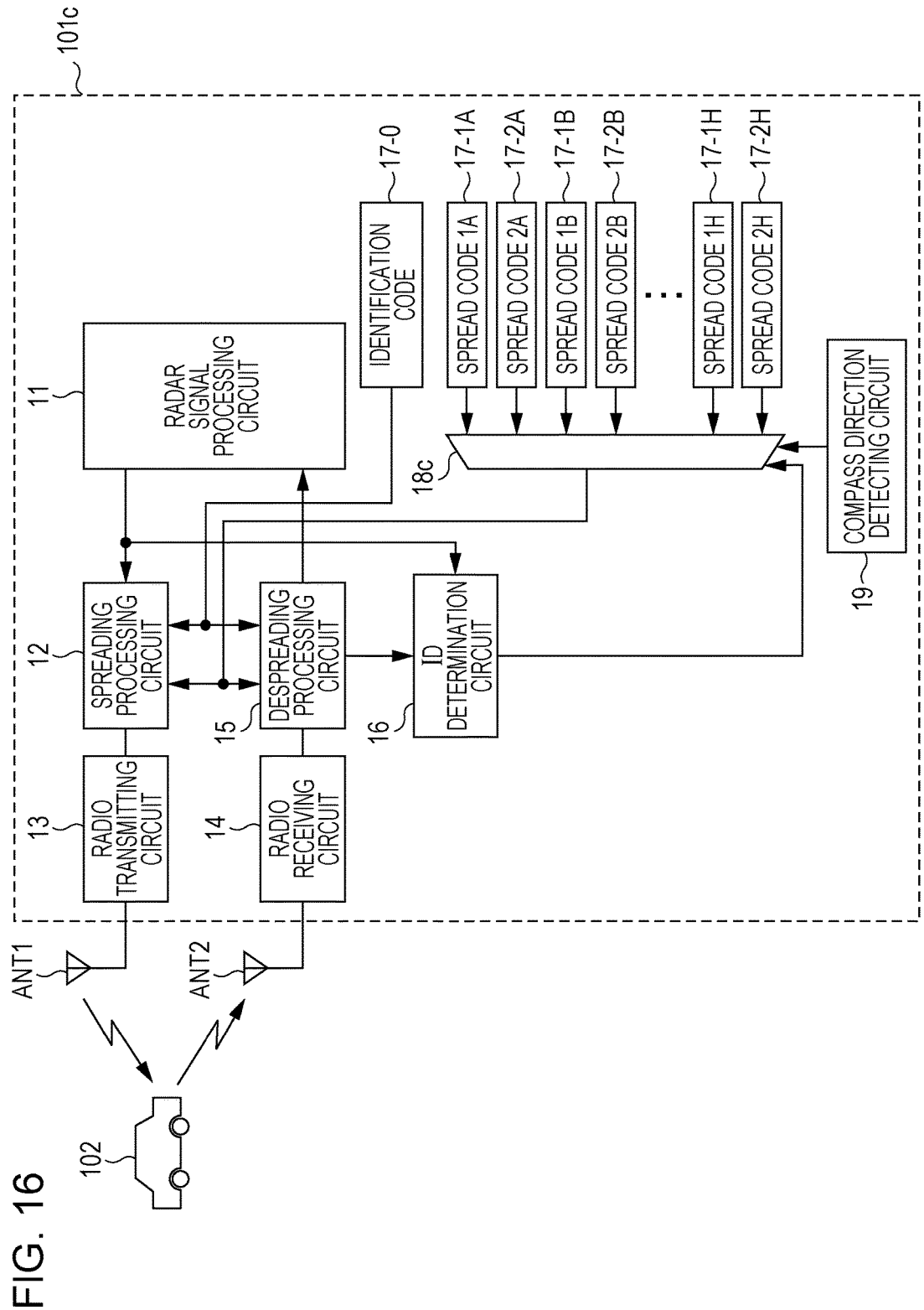
FIG. 16 is a block diagram showing the configuration of a car including a radar apparatus according to a third embodiment of the present disclosure.

FIG. 16 is a block diagram showing the configuration of a car 101*c* including a radar apparatus according to a third embodiment of the present disclosure. The first and second embodiments may be combined. FIG. 16 shows the configuration of a radar apparatus which is a combination of the radar apparatus in FIG. 1 and the radar apparatus in FIG. 8. The radar apparatus of the car 101*c* includes a radar signal processing circuit 11, a transmitting antenna ANT1, a receiving antenna ANT2, a spreading processing circuit 12, a radio transmitting circuit 13, a radio receiving circuit 14, a despreading processing circuit 15, an ID determination circuit 16, registers 17-0 and 17-1A to 17-2H, a selector 18*c*, and a compass direction detecting circuit 19. The radar signal processing circuit 11, the spreading processing circuit 12, the radio transmitting circuit 13, the radio receiving circuit 14, the despreading processing circuit 15, the ID determination circuit 16, and the register 17-0 in FIG. 16 are the same as the corresponding components in FIG. 1. The transmitting antenna ANT1, the receiving antenna ANT2, and the compass direction detecting circuit 19 are the same as the corresponding components in FIG. 8.

The registers 17-1A to 17-2H are storage devices storing a plurality of spread codes 1A to 2H, respectively, which are poorly correlated or not correlated with each other and are associated with a plurality of azimuth angles different from each other. A plurality of spread codes are associated with each of the plurality of azimuth angles. In the example in FIG. 16, two spread codes are associated with each azimuth angle. The compass direction detecting circuit 19 controls the selector 18*c* to select a plurality of spread codes associated with an azimuth angle for a direction in the vicinity of a front direction of a housing of the car 101*c* or the radar apparatus. The ID determination circuit 16 controls the selector 18*c* to select one of the plurality of spread codes selected by the compass direction detecting circuit 19, on the basis of the temporal positions and the magnitudes of peaks of first and second correlation values in each frame of a radar signal. The selector 18*c* selects one of the plurality of spread codes 1A to 2H and sends the one to the spreading processing circuit 12 and the despreading processing circuit 15, under control of the ID determination circuit 16 and the compass direction detecting circuit 19.

Figure 17:
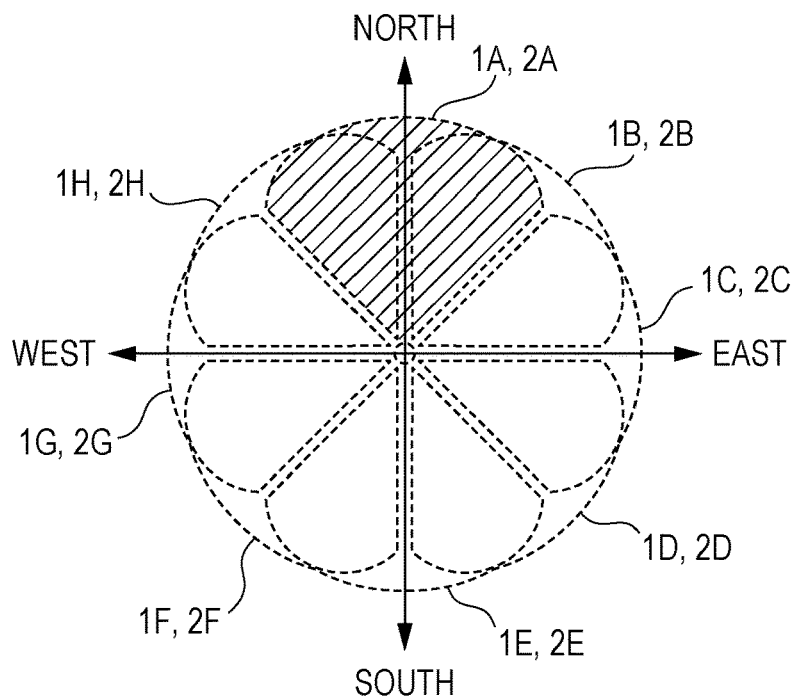
FIG. 17 is a top view showing beam patterns corresponding to spread codes in FIG. 16.

FIG. 17 is a top view showing beam patterns corresponding to the spread codes 1A to 2H in FIG. 16. The plurality of spread codes 1A to 2H are poorly correlated or not correlated with each other and are associated with the plurality of azimuth angles different from each other. Two spread codes are associated with each azimuth angle. For example, the spread codes 1A and 2A are associated with the north, and the spread codes 1E and 2E are associated with the south. The selector 18*c* selects spread codes associated with an azimuth angle for a direction in the vicinity of the front direction of the housing of the car 101*c* or the radar apparatus on the basis of the azimuth angle for the front direction of the housing of the car 101*c* or the radar apparatus, under control of the compass direction detecting circuit 19. For example, when the car 101*c* is moving in a northward direction, the selector 18*c* selects the spread codes 1A and 2A. When the car 101*c* is moving in a southward direction, the selector 18*c* selects the spread codes 1E and 2E. The selector 18*c* further selects one of the plurality of spread codes associated with the azimuth angle for a direction in the vicinity of the front direction of the housing of the car 101*c* or the radar apparatus on the basis of the temporal positions and the magnitudes of peaks of the first and second correlation values in each frame of a radar signal, under control of the ID determination circuit 16.

Figure 18:
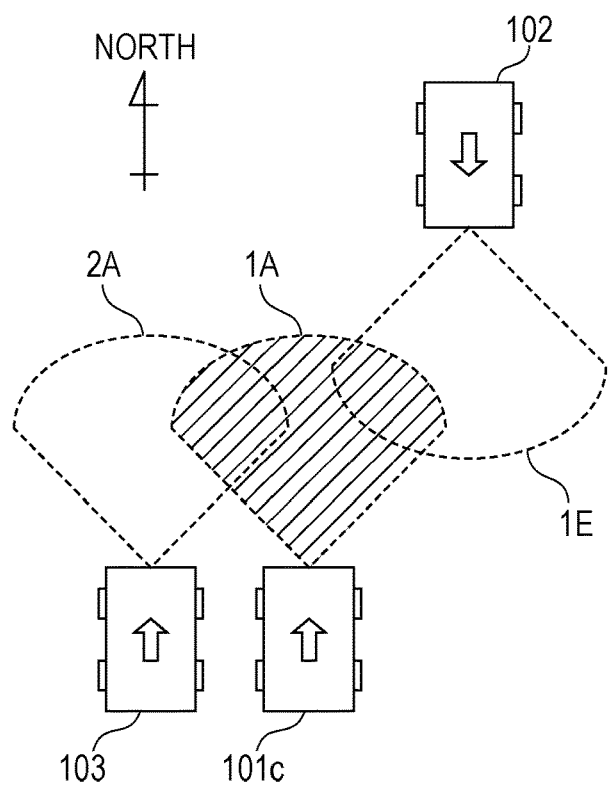
FIG. 18 is a top view showing a beam pattern when the cars in FIG. 16 approach each other as cars moving in opposite directions.

FIG. 18 is a top view showing a beam pattern when the car 101*c* and a car 102 in FIG. 16 approach each other as cars moving in opposite directions. Referring to FIG. 18, the car 102 is moving in the southward direction, and a radar apparatus of the car 102 transmits a radar signal spectrally spread by the spread code 1E. A car 103 is moving in the northward direction, and a radar apparatus of the car 103 transmits a radar signal spectrally spread by the spread code 2A. The car 101c is moving in the northward direction, and the radar apparatus of the car 101c can transmit a radar signal spectrally spread by the spread code 1A or 2A. Note that, when the radar apparatus of the car 101c receives a radar signal (the spread code 2A) transmitted by the radar apparatus of the car 103, the radar apparatus of the car 101c avoids use of the spread code 2A to prevent interference, selects the spread code 1A that is poorly correlated or not correlated with the spread code 2A under control of the ID determination circuit 16, and transmits a radar signal spectrally spread by the spread code 1A. Since the plurality of spread codes are poorly correlated or not correlated with each other, the radar apparatuses of the cars 101c, 102, and 103 can each detect an object around the car with high accuracy without interference of radar signals from the other radar apparatuses.

The radar apparatus in FIG. 16 is a combination of the radar apparatus in FIG. 1 and the radar apparatus in FIG. 8. The radar apparatus in FIG. 1 and the radar apparatus in FIG. 13 may also be combined into a radar apparatus. In this case, the radar apparatus includes a plurality of radar apparatus portions, and each of the plurality of radar apparatus portions includes a transmitting antenna, a receiving antenna, a spreading processing circuit, a radio transmitting circuit, a radio receiving circuit, a despreading processing circuit, a selector, and an ID determination circuit (or control circuit). The plurality of radar apparatus portions have beam directions different from each other in the vicinity of a front direction of a housing of a car or the radar apparatus. The selector of each radar apparatus portion selects a spread code associated with an azimuth angle for a direction in the vicinity of the beam direction of the radar apparatus portion.

Although two spread codes are associated with each azimuth angle in the example in FIG. 16, three or more spread codes may be associated with each azimuth angle.

In the example in FIG. 16, the radar apparatus of the car 101c includes one selector, the selector 18c. Instead of this, the radar apparatus of the car 101c may include a first selector which operates under control of the compass direction detecting circuit 19 and a second selector which operates under control of the ID determination circuit 16. In this case, the first selector selects a plurality of spread codes associated with an azimuth angle for a direction in the vicinity of the front direction of the housing of the car 101c or the radar apparatus under control of the compass direction detecting circuit 19. The second selector selects one spread code which causes no interference of the plurality of spread codes selected by the first selector under control of the ID determination circuit 16.

According to the present embodiment, it is possible to provide a radar apparatus using a new principle which is applicable to a pulse radar apparatus using a spread spectrum code and is intended to detect and prevent interference of a radar signal without the need for advance synchronization and complicated processing.

A radar apparatus according to a first aspect of the present disclosure includes: a transmitting antenna; a receiving antenna; transmitting circuitry which generates a radar signal and transmits the radar signal through the transmitting antenna; receiving circuitry which receives the radar signal reflected by an object through the receiving antenna; a storage which stores an identification code unique to the radar apparatus and a plurality of spread codes; and control circuitry which selects one of the plurality of spread codes, the radar signal includes a plurality of periodic frames, each of the frames includes first and second segments, the first segment includes a first spread signal which is obtained by multiplication of a predetermined reference signal by at least a part of the selected spread code, the second segment includes a second spread signal which is obtained by multiplication of the identification code by at least the part of the selected spread code, and the control circuitry calculates a first correlation value between the received radar signal and the first spread signal, calculates a second correlation value between the received radar signal and the second spread signal, and selects one of the plurality of spread codes on a basis of temporal positions and magnitudes of peaks of the first and second correlation values in each frame.

A radar apparatus according to a second aspect of the present disclosure is the radar apparatus according to the first aspect, in which the control circuitry does not change the currently selected spread code if in each frame, an error of a time difference between the peaks of the first and second correlation values with respect to a predetermined reference time difference falls within a predetermined range, and a ratio of the magnitude of the peak of the second correlation value to the magnitude of the peak of the first correlation value exceeds a predetermined threshold, and selects one of the plurality of spread codes which is different from the currently selected spread code if in each frame, the error of the time difference between the peaks of the first and second correlation values with respect to the reference time difference falls outside the predetermined range or if the ratio of the magnitude of the peak of the second correlation value to the magnitude of the peak of the first correlation value is not more than the threshold.

A radar apparatus according to a third aspect of the present disclosure is the radar apparatus according to the first or second aspect, in which the first spread signal is generated by multiplication of the reference signal by a whole of the selected spread code, and the second spread signal is generated by multiplication of the identification code by the whole of the selected spread code.

A radar apparatus according to a fourth aspect of the present disclosure is the radar apparatus according to the first or second aspect, wherein each frame has a length equal to a whole of the selected spread code, the selected spread code includes a first portion corresponding to the first segment of each frame and a second portion corresponding to the second segment of each frame, the first spread signal is generated by multiplication of the reference signal by the first portion of the selected spread code, and the second spread signal is generated by multiplication of the identification code by the second portion of the selected spread code.

A radar apparatus according to a fifth aspect of the present disclosure is the radar apparatus according to any one of the first to fourth aspects, in which the reference signal has a fixed value over the first segment of each frame.

A radar apparatus according to a sixth aspect of the present disclosure is the radar apparatus according to any one of the first to fifth aspects, in which the radar apparatus further includes a housing and compass direction detecting circuitry which detects an azimuth angle for a predetermined front direction of the housing, the transmitting antenna has a beam direction in a vicinity of the front direction, the receiving antenna has a beam direction in the vicinity of the front direction, the plurality of spread codes are associated with a plurality of azimuth angles different from each other, and the control circuitry selects one of spread codes which are associated with an azimuth angle for a direction in the vicinity of the front direction on the basis of the temporal positions and the magnitudes of the peaks of the first and second correlation values in each frame.

A radar apparatus according to a seventh aspect of the present disclosure is the radar apparatus according to the sixth aspect, in which the radar apparatus includes a plurality of radar apparatus portions, each of the plurality of radar apparatus portions including the transmitting antenna, the receiving antenna, the transmitting circuitry, and the receiving circuitry, the plurality of radar apparatus portions have beam directions different from each other in the vicinity of the front direction, and the control circuitry selects, for each of the radar apparatus portions, one of the spread codes which are associated with the azimuth angle for the direction in a vicinity of the beam direction of the radar apparatus portion on the basis of the temporal positions and the magnitudes of the peaks of the first and second correlation values in each frame.

A radar apparatus according to an eighth aspect of the present disclosure includes: a housing; a transmitting antenna which has a beam direction in a vicinity of a predetermined front direction of the housing; a receiving antenna which has a beam direction in the vicinity of the front direction; transmitting circuitry which generates a radar signal and transmits the radar signal through the transmitting antenna; receiving circuitry which receives the radar signal reflected by an object through the receiving antenna; compass direction detecting circuitry which detects an azimuth angle for the front direction; a storage which stores a plurality of spread codes associated with a plurality of azimuth angles different from each other; and control circuitry which selects a spread code associated with an azimuth angle for a direction in the vicinity of the front direction among the plurality of spread codes, the radar signal is spectrally spread by the selected spread code, and the control circuitry spectrally despreads the radar signal received through the receiving antenna by the selected spread code.

A radar apparatus according to a ninth aspect of the present disclosure is the radar apparatus according to the eighth aspect, in which the radar apparatus includes a plurality of radar apparatus portions, each of the plurality of radar apparatus portions including the transmitting antenna, the receiving antenna, the transmitting circuitry, and the receiving circuitry, the plurality of radar apparatus portions have beam directions different from each other in the vicinity of the front direction, and the control circuitry selects, for each of the radar apparatus portions, a spread code which is associated with the azimuth angle for the direction in a vicinity of the beam direction of the radar apparatus portion.

A vehicle according to a tenth aspect of the present disclosure is a vehicle including the radar apparatus according to any one of the first to ninth aspects, the transmitting antenna and the receiving antenna have a beam direction in a vicinity of a direction of forward movement of the vehicle, and the radar apparatus further includes a radar signal processing circuitry which detects an object located in the direction of forward movement of the vehicle on a basis of the radar signal.

One memory may be used instead of all or some of the registers 17-0 to 17-N, 17-A to 17-H, 17-1A to 17-1H, and 17-2A to 17-2H described above.

All or some of the radar signal processing circuit 11, the spreading processing circuit 12, the despreading processing circuit 15, the ID determination circuit 16, and the selector 18 shown in FIG. 1 may be implemented by one or a plurality of electronic circuits including a semiconductor device, a semiconductor integrated circuit (IC), or a large scale integration (LSI). All or some of the radar signal processing circuit 11, the spreading processing circuit 12a, the despreading processing circuit 15a, and the selector 18 shown in FIG. 8 may also be implemented by one or a plurality of electronic circuits including a semiconductor device, an IC, or an LSI. All or some of the radar signal processing circuit 11b, the spreading processing circuits 12-1 and 12-2, the despreading processing circuits 15-1 and 15-2, and the selectors 18-1 and 18-2 shown in FIG. 13 may also be implemented by one or a plurality of electronic circuits including a semiconductor device, an IC, or an LSI. All or some of the radar signal processing circuit 11, the spreading processing circuit 12, the despreading processing circuit 15, the ID determination circuit 16, and the selector 18c shown in FIG. 16 may also be implemented by one or a plurality of electronic circuits including a semiconductor device, an IC, or an LSI.

An LSI or an IC may be integrated into one chip or may be constructed by combining a plurality of chips. For example, a functional block other than a storage element may be integrated into one chip. Although an integrated circuit is called an LSI or an IC here, an integrated circuit is called differently depending on the degree of integration. An integrated circuit called a system LSI, a very large scale integration (VLSI), or an ultra large scale integration (ULSI) may be used. A field programmable gate array (FPGA) which is programmed after LSI manufacture or a reconfigurable logic device which allows reconfiguration of a connection relation inside an LSI or setup of circuit compartments inside an LSI can be used for the same purposes.

The functions or processes of all or some of the radar signal processing circuit 11, the spreading processing circuit 12, the despreading processing circuit 15, the ID determination circuit 16, and the selector 18 shown in FIG. 1 can be executed by software. The functions or processes of all or some of the radar signal processing circuit 11, the spreading processing circuit 12a, the despreading processing circuit 15a, and the selector 18 shown in FIG. 8 can also be executed by software. The functions or processes of all or some of the radar signal processing circuit 11b, the spreading processing circuits 12-1 and 12-2, the despreading processing circuits 15-1 and 15-2, and the selectors 18-1 and 18-2 shown in FIG. 13 can also be executed by software. The functions or processes of all or some of the radar signal processing circuit 11, the spreading processing circuit 12, the despreading processing circuit 15, the ID determination circuit 16, and the selector 18c shown in FIG. 16 can also be executed by software.

In the above-described cases, software is recorded on one or a plurality of non-transitory recording media, such as a ROM, an optical disc, or a hard disk drive. When the software is executed by a processor, the software causes the processor and peripheral devices to execute specific functions of the software. A system or an apparatus may include the one or the plurality of non-transitory recording media having the software recorded thereon, the processor, and desired hardware devices (for example, an interface).

According to the present disclosure, it is possible to provide a radar apparatus for detecting an object around a vehicle, such as a car, in the vehicle. The present disclosure can also provide a vehicle including the radar apparatus.

What is claimed is:

1. A radar apparatus comprising:

a transmitting antenna;

a receiving antenna;

transmitting circuitry which generates a radar signal and transmits the radar signal through the transmitting antenna;

receiving circuitry which receives the radar signal reflected by an object through the receiving antenna;

a storage which stores an identification code unique to the radar apparatus and a plurality of spread codes; and control circuitry which selects one of the plurality of spread codes, wherein the radar signal includes a plurality of periodic frames, each of the frames includes first and second segments, the first segment includes a first spread signal which is obtained by multiplication of a predetermined reference signal by at least a part of the selected spread code, the second segment includes a second spread signal which is obtained by multiplication of the identification code by at least the part of the selected spread code, and the control circuitry calculates a first correlation value between the received radar signal and the first spread signal, calculates a second correlation value between the received radar signal and the second spread signal, and selects another one of the plurality of spread codes on a basis of temporal positions and magnitudes of peaks of the first and second correlation values in each frame.

2. The radar apparatus according to claim 1, wherein the control circuitry does not change the currently selected spread code if in each frame, an error of a time difference between the peaks of the first and second correlation values with respect to a predetermined reference time difference falls within a predetermined range, and a ratio of the magnitude of the peak of the second correlation value to the magnitude of the peak of the first correlation value exceeds a predetermined threshold, and selects the other one of the plurality of spread codes which is different from the currently selected spread code if in each frame, the error of the time difference between the peaks of the first and second correlation values with respect to the reference time difference falls outside the predetermined range or if the ratio of the magnitude of the peak of the second correlation value to the magnitude of the peak of the first correlation value is not more than the threshold.

3. The radar apparatus according to claim 1, wherein the first spread signal is generated by multiplication of the reference signal by a whole of the selected spread code, and the second spread signal is generated by multiplication of the identification code by the whole of the selected spread code.

4. The radar apparatus according to claim 1, wherein each frame has a length equal to a whole of the selected spread code, the selected spread code includes a first portion corresponding to the first segment of each frame and a second portion corresponding to the second segment of each frame, the first spread signal is generated by multiplication of the reference signal by the first portion of the selected spread code, and the second spread signal is generated by multiplication of the identification code by the second portion of the selected spread code.

5. The radar apparatus according to claim 1, wherein the reference signal has a fixed value over the first segment of each frame.

6. The radar apparatus according to claim 1, further comprising:

a housing; and compass direction detecting circuitry which detects an azimuth angle for a predetermined front direction of the housing, wherein the transmitting antenna has a beam direction in a vicinity of the front direction, the receiving antenna has a beam direction in the vicinity of the front direction, the plurality of spread codes are associated with a plurality of azimuth angles different from each other, and the control circuitry selects one of spread codes which are associated with an azimuth angle for a direction in the vicinity of the front direction on the basis of the temporal positions and the magnitudes of the peaks of the first and second correlation values in each frame.

7. The radar apparatus according to claim 6, wherein the radar apparatus includes a plurality of radar apparatus portions, each of the plurality of radar apparatus portions including the transmitting antenna, the receiving antenna, the transmitting circuitry, and the receiving circuitry, the plurality of radar apparatus portions have beam directions different from each other in the vicinity of the front direction, and the control circuitry selects, for each of the radar apparatus portions, one of the spread codes which are associated with the azimuth angle for the direction in a vicinity of the beam direction of the radar apparatus portion on the basis of the temporal positions and the magnitudes of the peaks of the first and second correlation values in each frame.

8. A radar apparatus comprising:

a housing;

a transmitting antenna which has a beam direction in a vicinity of a predetermined front direction of the housing;

a receiving antenna which has a beam direction in the vicinity of the front direction;

transmitting circuitry which generates a radar signal and transmits the radar signal through the transmitting antenna;

receiving circuitry which receives the radar signal reflected by an object through the receiving antenna;

compass direction detecting circuitry which detects an azimuth angle for the front direction;

a storage which stores a plurality of spread codes associated with a plurality of azimuth angles different from each other; and control circuitry which selects a spread code associated with an azimuth angle for a direction in the vicinity of the front direction among the plurality of spread codes, wherein the radar signal is spectrally spread by the selected spread code, and the control circuitry spectrally despreads the radar signal received through the receiving antenna by the selected spread code.

9. The radar apparatus according to claim 8, wherein
the radar apparatus includes a plurality of radar apparatus portions, each of the plurality of radar apparatus portions including the transmitting antenna, the receiving antenna, the transmitting circuitry, and the receiving circuitry,
the plurality of radar apparatus portions have beam directions different from each other in the vicinity of the front direction, and
the control circuitry selects, for each of the radar apparatus portions, a spread code which is associated with the azimuth angle for the direction in a vicinity of the beam direction of the radar apparatus portion.

10. A vehicle comprising a radar apparatus, wherein
the radar apparatus includes
  a transmitting antenna which has a beam direction in a vicinity of a direction of forward movement of the vehicle,
  a receiving antenna which has a beam direction in the vicinity of the direction of forward movement,
  transmitting circuitry which generates a radar signal and transmits the radar signal through the transmitting antenna,
  receiving circuitry which receives the radar signal reflected by an object located in the direction of forward movement of the vehicle through the receiving antenna,
  storage which stores an identification code unique to the radar apparatus and a plurality of spread codes, and
  control circuitry which selects one of the plurality of spread codes and detects the object on a basis of the radar signal,
the radar signal includes a plurality of periodic frames,
each of the frames includes first and second segments,
the first segment includes a first spread signal which is obtained by multiplication of a predetermined reference signal by at least a part of the selected spread code,
the second segment includes a second spread signal which is obtained by multiplication of the identification code by at least the part of the selected spread code, and
the control circuitry calculates a first correlation value between the received radar signal and the first spread signal, calculates a second correlation value between the received radar signal and the second spread signal, and selects another one of the plurality of spread codes on a basis of temporal positions and magnitudes of peaks of the first and second correlation values in each frame.

11. A vehicle comprising a radar apparatus, wherein
the radar apparatus includes
  a transmitting antenna which has a beam direction in a vicinity of a direction of forward movement of the vehicle,
  a receiving antenna which has a beam direction in the vicinity of the direction of forward movement,
  transmitting circuitry which generates a radar signal and transmits the radar signal through the transmitting antenna,
  receiving circuitry which receives the radar signal reflected by an object located in the direction of forward movement of the vehicle through the receiving antenna,
  compass direction detecting circuitry which detects an azimuth angle for the direction of forward movement,
  a storage which stores a plurality of spread codes associated with a plurality of azimuth angles different from each other, and
  control circuitry which selects a spread code associated with an azimuth angle for a direction in the vicinity of the direction of forward movement among the plurality of spread codes and detects the object on a basis of the radar signal,
the radar signal is spectrally spread by the selected spread code, and
the control circuitry spectrally despreads the radar signal received through the receiving antenna by the selected spread code.

\* \* \* \* \*